US012662135B1

(12) United States Patent (10) Patent No.: US 12,662,135 B1

Pronovost et al. (45) Date of Patent: Jun. 23, 2026

(54) GENERATING SYNTHETIC DRIVING SCENES INCLUDING TEMPORARY TRAFFIC CONTROL ZONES

(71) Applicant: Zoox, Inc., Foster City, CA (US)

(72) Inventors: Ethan Miller Pronovost, Redwood City, CA (US); Andres Guillermo Morales Morales, San Francisco, CA (US); Oytun Ulutan, Buena Park, CA (US)

(73) Assignee: Zoox, Inc., Foster City, CA (US)

( * ) Notice: Subject to any disclaimer, the term of this patent is extended or adjusted under 35 U.S.C. 154(b) by 151 days.

(21) Appl. No.: 18/385,706

(22) Filed: Oct. 31, 2023

(51) Int. Cl.
B60W 40/09 (2012.01)
(52) U.S. Cl.
CPC ..... B60W 40/09 (2013.01); B60W 2554/4049 (2020.02); B60W 2554/408 (2020.02)
(58) Field of Classification Search
CPC ......... B60W 40/09; B60W 2554/4049; B60W 2554/408
See application file for complete search history.

(56) References Cited

U.S. PATENT DOCUMENTS

| 11,814,059 B1 * | 11/2023 | Reschka | .............. | B60W 40/09 |
| 2018/0164825 A1 * | 6/2018 | Matus | .............. | B60W 50/0098 |
| 2020/0269843 A1 * | 8/2020 | Wissing | .......... | B60W 30/18163 |
| 2023/0202507 A1 * | 6/2023 | Chu | ....................... | G06V 20/20 |
| | | | | 701/23 |

OTHER PUBLICATIONS

L. Balasubramanian, J. Wurst, R. Egolf, M. Botsch, W. Utschick and K. Deng, "SceneDiffusion: Conditioned Latent Diffusion Models for Traffic Scene Prediction," 2023 IEEE 26th International Conference on Intelligent Transportation Systems (ITSC), Bilbao, Spain, 2023, doi:10.1109/ITSC57777.2023.10422482 (Year: 2023).*

* cited by examiner

*Primary Examiner* — Aniss Chad

*Assistant Examiner* — Christine Nguyen Huynh

(74) *Attorney, Agent, or Firm* — Lee & Hayes, P.C.

(57) ABSTRACT

Techniques are described herein for generating, using diffusion models and/or other generative models, synthetic driving scenes including traffic control zones. In various examples, a driving scene generator may provide the generative model with map data representing a driving environment, and input data representing attributes or objects of a traffic control zone (e.g., a construction zone). The diffusion model may be trained to populate the driving scene by generating agents and objects inside and outside of the traffic control zone in a realistic manner, consistent with the input data, to generate a synthetic driving scene. Synthetic driving scenes generated using generative models may be used to execute realistic simulations targeting specific driving scenarios that include construction zones and other traffic control zones.

20 Claims, 8 Drawing Sheets

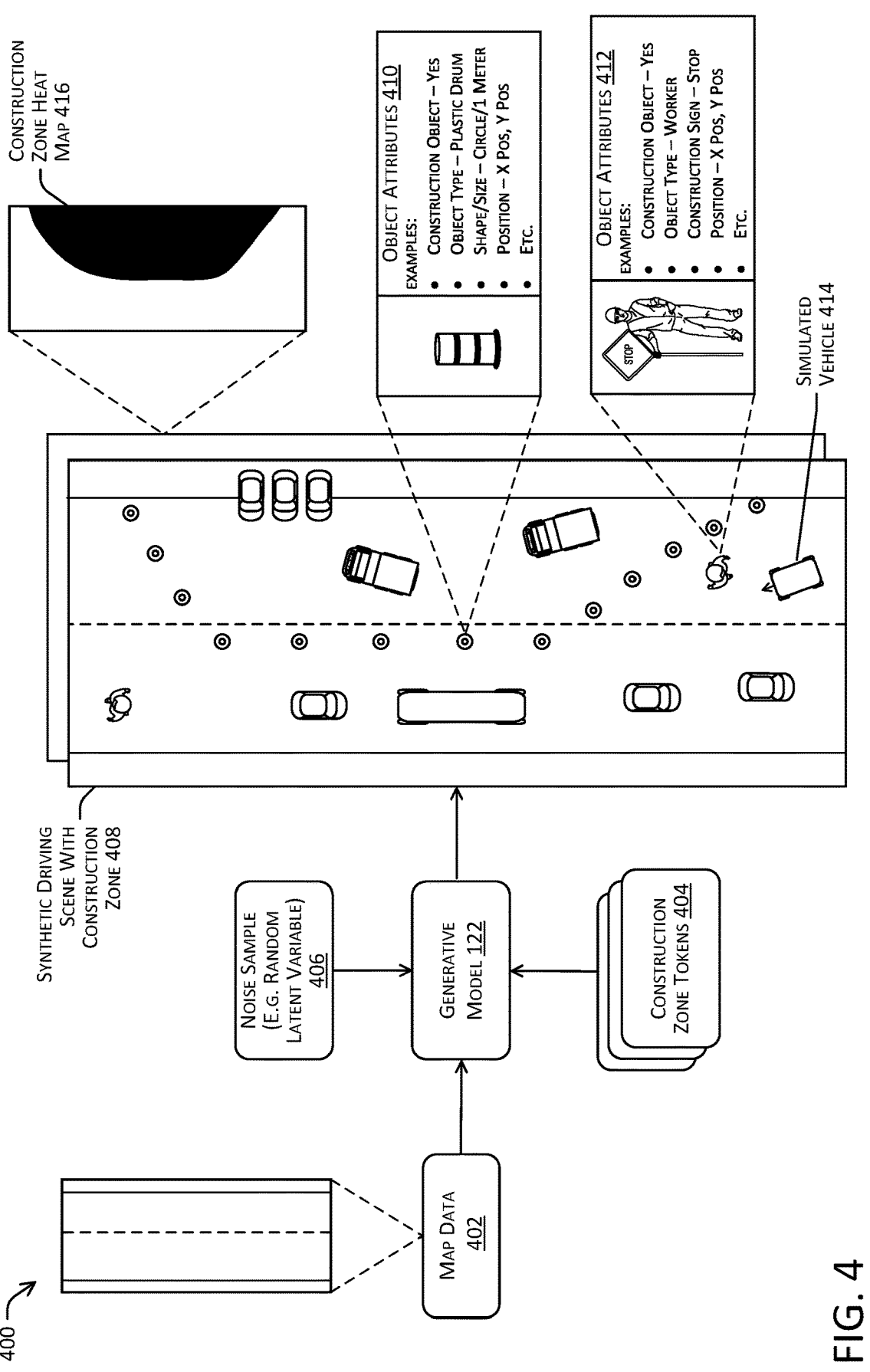

CONSTRUCTION ZONE HEAT MAP 416

OBJECT ATTRIBUTES 410
EXAMPLES:
• CONSTRUCTION OBJECT – YES
• OBJECT TYPE – PLASTIC DRUM
• SHAPE/SIZE – CIRCLE/1 METER
• POSITION – X POS, Y POS
• ETC.

OBJECT ATTRIBUTES 412
EXAMPLES:
• CONSTRUCTION OBJECT – YES
• OBJECT TYPE – WORKER
• CONSTRUCTION SIGN – STOP
• POSITION – X POS, Y POS
• ETC.

SIMULATED VEHICLE 414

SYNTHETIC DRIVING SCENE WITH CONSTRUCTION ZONE 408

NOISE SAMPLE (E.G. RANDOM LATENT VARIABLE) 406

GENERATIVE MODEL 122

CONSTRUCTION ZONE TOKENS 404

MAP DATA 402

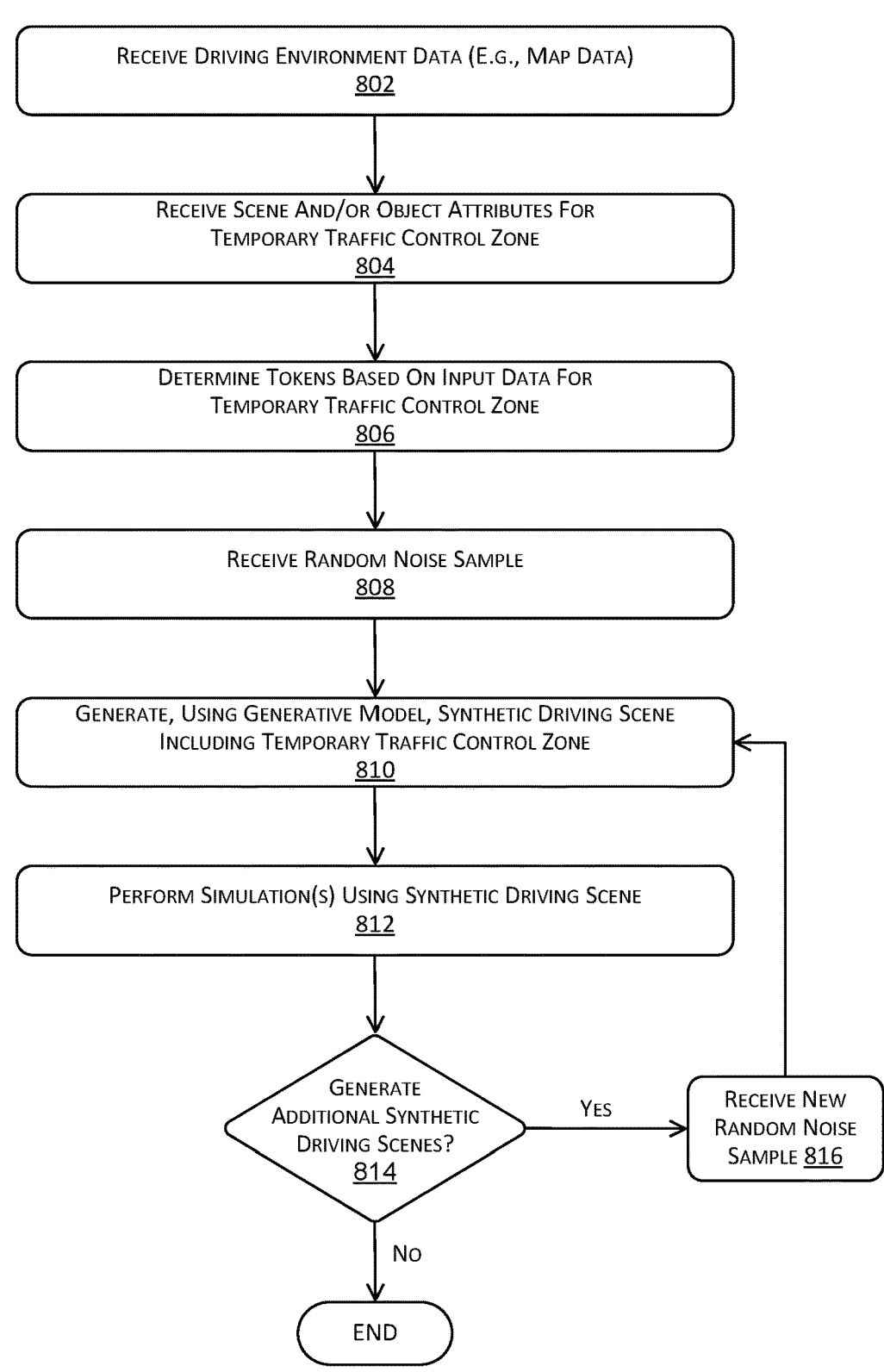

RECEIVE DRIVING ENVIRONMENT DATA (E.G., MAP DATA)
802

RECEIVE SCENE AND/OR OBJECT ATTRIBUTES FOR
TEMPORARY TRAFFIC CONTROL ZONE
804

DETERMINE TOKENS BASED ON INPUT DATA FOR
TEMPORARY TRAFFIC CONTROL ZONE
806

RECEIVE RANDOM NOISE SAMPLE
808

GENERATE, USING GENERATIVE MODEL, SYNTHETIC DRIVING SCENE
INCLUDING TEMPORARY TRAFFIC CONTROL ZONE
810

PERFORM SIMULATION(S) USING SYNTHETIC DRIVING SCENE
812

GENERATE
ADDITIONAL SYNTHETIC
DRIVING SCENES?
814

YES

RECEIVE NEW
RANDOM NOISE
SAMPLE 816

NO

END

FIG. 8

GENERATING SYNTHETIC DRIVING SCENES INCLUDING TEMPORARY TRAFFIC CONTROL ZONES

BACKGROUND

Simulated data and simulations can be used to test and validate the features and functionalities of systems, including features and functionalities that may be otherwise prohibitive to test in the real world (e.g., due to safety concerns, limitations on time, repeatability, etc.). For example, autonomous vehicles and other robotic devices may use driving simulations to test and improve passenger safety, vehicle decision-making, sensor data analysis, and route optimization. Driving simulations may be executed by controlling simulated vehicles and/or other agents within simulated driving environments. Simulated driving environments can include driving scenes captured within the log data of vehicles traversing real-world driving environments, and/or may include synthetically generated driving scenes. Synthetic driving scenes may provide a number of advantages for performing driving simulations, including the ability to test specific driving scenarios for which log data might not be available. However, creating synthetic driving scenes for simulations that accurately reflect real-world driving scenarios and validate functionality of vehicle systems is technically challenging. For example, manual generation of realistic synthetic scenarios by users can be time-consuming, while programmatically generated synthetic scenarios often fail to reflect real-world agent behaviors and interactions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates example techniques of using a generative model to generate a synthetic driving scene including a temporary traffic control zone and associated heat map, in accordance with one or more examples of the disclosure.

FIG. 8 is a flow diagram illustrating an example process for generating synthetic driving scenes including temporary traffic control zones, and executing driving simulations based on the synthetic driving scenes, in accordance with one or more examples of the disclosure.

DETAILED DESCRIPTION

Figure 1:
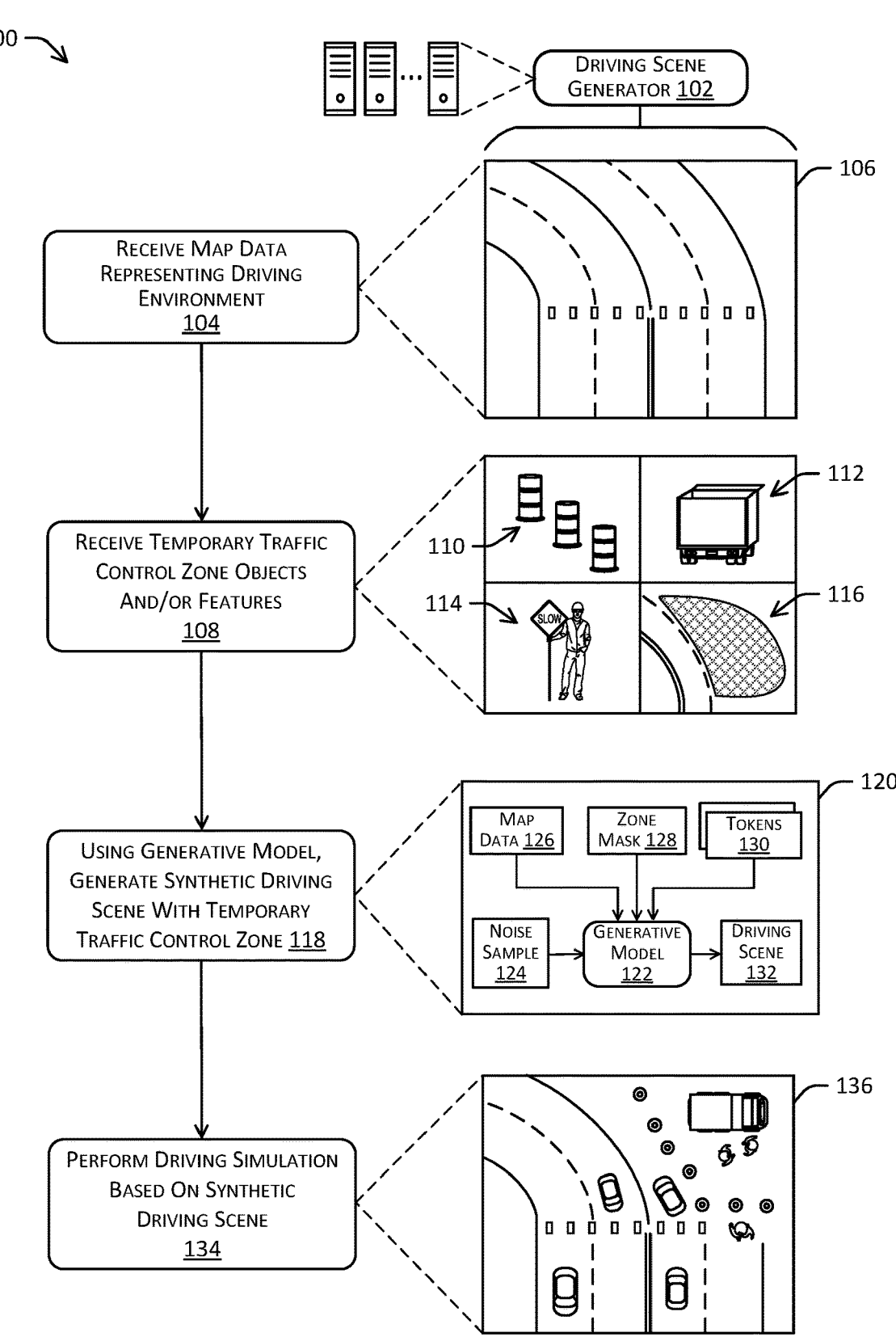
FIG. 1 illustrates an example technique using a driving scene generator to generate a synthetic driving scene including a temporary traffic control zone, in accordance with one or more examples of the disclosure.

This application describes techniques using machine-learned (ML) generative models to generate synthetic driving scenes that include temporary traffic control zones. In various examples described herein, a driving scene generator configured to use a trained diffusion model (and/or other generative model) may receive map data representing a driving environment, and additional input data relating to a temporary traffic control zone (e.g., a construction zone) to be generated within a driving scene. The driving scene generator may generate conditioning tokens and/or may use various other techniques to condition or otherwise control the trained diffusion model. The driving scene generator then may provide the map data, tokens, and/or other conditioning data to a diffusion model trained to generate a synthetic driving scene. The diffusion model may generate a realistic synthetic driving scene, including a temporary traffic control zone, that is consistent with the input map data, various agent/object tokens, and any other conditioning input provided to the model. Synthetic driving scenes generated based on trained diffusion models using the techniques described herein may be used to execute realistic driving simulations that can control and evaluate the performance of simulated vehicles in and around temporary traffic control zones.

A driving scene (which also may be referred to as a driving scenario) may refer to a real or virtual driving environment in which a vehicle may operate over a period of time. Within driving simulation systems, driving scenes may be represented as virtual environments in which the vehicle control systems and/or other software-based systems and features of autonomous vehicles can be tested and validated. Within real-world environments, driving scenes can be represented by static objects and/or agents (e.g., dynamic objects) in the physical environment proximate to a vehicle. For driving scenes represented in real or virtual environments, the driving scenes may include map data and/or environment data representing a road configuration around the vehicle, and also may include road conditions, weather conditions, lighting conditions, etc. Driving scenes also may include data representing the vehicle that may be validated in the simulation, and data representing any number of additional agents and/or other objects in the environment. For instance, data representing a driving scene may include object types, positions, sizes, headings, velocities, and/or other state data, for the vehicle itself and for any number of additional agents proximate to the vehicle in the environment. In some examples, driving scene data may include a representation of the environment over a period of time, rather than a single snapshot of the environment, so that the vehicle systems may receive the driving scene as input data, detect changes in the environment over time, and perform driving maneuvers and/or behaviors based on a predicted future state of the environment.

Techniques described herein relate to using generative models to generate synthetic driving scenes including temporary traffic control zones that can be used to perform driving simulations (and/or can be used to control a vehicle in a physical environment). In various examples, the generative models described herein may include diffusion models and/or other deep learning models (e.g., text-to-image models) configured to use stable diffusion techniques.

Additionally, as used herein, a temporary traffic control zone may refer to a region of a driving environment in which the normal roadway conditions (e.g., drivable surface areas, lane markings, right-of-way, traffic control signs and directives, etc.) may be changed because of a work zone or other temporary activities. For instance, various examples herein may refer to generating driving scenes that include construction zones. However, similar or identical techniques may be used to generate driving scenes that include other types of temporary traffic control zones, such as scenes involving traffic accidents, police investigation areas, roads with downed trees, poles, or power lines, areas in which traffic control officers are used temporarily (e.g., traffic light outages, after a large concert or sporting event, school crossings and school-related traffic control, etc.).

Synthetic driving scenes may refer to driving scenes not generated directly based on vehicle log data and/or other sensor data captured within a driving environment. As noted above, synthetic driving scenes may provide advantages over log-based driving scenes (e.g., driving scenes generated from the log data vehicles traversing real-world driving environments), including the ability to represent specific driving scenarios for which log data might not be available. When performing driving simulations to test and validate the vehicle control systems of an autonomous vehicle, synthetic generation of driving scenes may allow for more robust coverage of simulated driving scenes and simulation scenarios that do not occur frequently in real-world driving situations. In particular, construction zones and other temporary traffic control zones may be low-frequency driving scenes/scenarios, for which relatively less training data (e.g., vehicle log data) may be available. Therefore, driving scene generators that rely solely on ground truth driving scenes may fail to adequately test the performance of vehicle systems encountering and traversing construction zones and other uncommon scenarios. Moreover, evaluating the performance of vehicle systems within construction zones and similar driving scenes may be important, because although such scenes are relatively low-frequency they also may be relatively high-risk with respect to potential accidents, passenger safety, risks to the other vehicles and pedestrians, etc.

Various manual and/or programmatic techniques may be used to generate synthetic driving scenes for performing driving simulations and other purposes. However, manual techniques for generating synthetic driving scenes can be time-consuming and error prone. Additionally, certain programmatic techniques may generate driving scenes that are not based on or constrained by real-world vehicle log data. As a result, the driving scenes generated with these techniques may fail to reflect realistic object configurations, agent behaviors and/or interactions.

To address the technical challenges of generating synthetic driving scenes that represent low-frequency, valuable, and/or customizable driving situations, but also reflect realistic driving scenes and situations, the techniques described herein use generative models (e.g., diffusion models) to generate driving scenes based on received map data and additional input data relating to a driving environment including a temporary traffic control zone. In some examples, a driving scene generator can implement and train a diffusion model to generate a driving scene including a construction zone, based on input data including map data representing a driving environment and one or more input tokens representing desired configurations of objects (including static objects and/or agents), and/or scene-level attributes of the driving scene to be generated. As described below, the driving scene generator may use the token to condition the diffusion model while performing the iterative diffusion process, causing the model to output a driving scene that is consistent with the set of desired scene characteristics. The diffusion model may be trained to populate the synthetic driving scene with any number of additional objects, including generating and positioning the additional objects in a realistic manner relative to any predetermined objects represented by the tokens.

When generating a synthetic driving scene including a construction zone (or other temporary traffic control zone), the diffusion model may receive a random noise sample and may iteratively de-noise the sample. During the iterative de-noising process, the driving scene generator may use the map data and tokens as conditioning inputs to control diffusion inference operations of the diffusion model, to determine a fully formed (e.g., de-noised) realistic driving scene. In some cases, the diffusion model may be trained to output feature vectors representing any predetermined objects (e.g., static objects and/or agents) within the driving scene, and any additional object generated during the diffusion inference process. As described below, both the predetermined objects and the additional objects generated by the diffusion model may include objects (e.g., traffic safety equipment) associated with the construction zone (e.g., traffic cones, lane barriers, construction workers, construction vehicles, etc.). The predetermined objects for the driving scene and the additional objects generated using the diffusion model also may include objects that are not specifically tied to or associated with the construction zone, such as vehicles or pedestrians traversing through or around the construction zone. The feature vectors output by the diffusion model may represent a combination of objects associated with the construction zone and/or additional objects that are not related to the construction zone but may be positioned or moving in or around the construction zone. The feature vectors output by the diffusion model can be provided to a trained decoder of a variable autoencoder, which may be configured to receive the map data representing the driving environment and the feature vectors from the diffusion model, and to output object representations (e.g., bounding boxes, sizes, locations, headings, types, etc.) for the object in the driving scene.

In some examples, the driving scene generator may receive input data representing one or more predetermined objects (e.g., static objects or agents) and/or other predetermined driving scene attributes to be included in the synthetic driving scene. Based on the input data, the driving scene generator may determine various types of tokens to provide to the diffusion model, which can be used to condition the diffusion model by guiding or controlling the inference operations as the diffusion model de-noises a noise sample to generate a synthetic driving scene. In various examples, different types of tokens may be supported and used by the diffusion model, including object tokens, agent tokens, scene description tokens, scene density tokens, etc. Object tokens and/or agent tokens may have one-to-one or one-to-many relationships with objects/agents in the driving scene, and may define any combination of predetermined attributes for an object/agent to be included in the driving scene. Additional types of tokens, such as scene-level description tokens, scene density tokens, etc., may define additional predetermined attributes for the synthetic driving scene. Additional examples of techniques and features for generating synthetic driving scenes using a diffusion model, including using tokens to condition the model based on predetermined input data, can be found, for example, in U.S. patent application Ser. No. 18/217,377, filed Jun. 30, 2023, and titled "Generating Synthetic Driving Trajectories Using Diffusion Guidance," and in U.S. patent application Ser. No. 18/222,158, filed Jul. 14, 2023, and titled "Generating Synthetic Driving Scenes Using Diffusion Models," both of which are incorporated by reference herein, in their entirety, for all purposes.

When generating a synthetic driving scene, the driving scene generator may receive any number of predetermined object/agent data, predetermined driving scene attributes, and/or other requirements for the driving scene to be generated. The driving scene generator may determine tokens based on the predetermined object, agent, and scene data. The diffusion model may be executed using the tokens to condition the diffusion process, thereby causing the model to generate a realistic driving scene that is compatible with the predetermined object, agent, and scene data. Because the diffusion model may be trained using realistic ground truth driving scenes, during inference it may populate the synthetic driving scene with additional objects and/or agents, such that the types, sizes, positions, and orientations of the additional objects/agents are realistic relative to the particular driving environment (e.g., the map data), the predetermined agents, and the other additional agents generated by the diffusion model.

Construction zones (and other temporary traffic control zones) may be different from other driving areas in several respects. For example, construction zones may include various types of specialized objects/agents that convey different information and/or behave differently from other objects/agents in normal driving environments. The presence of a construction zone also may cause differences in the drivable road surface, the driving lanes, and the traffic directives that vehicles, bicycles, and pedestrians may use to traverse through or around the construction zone. As a result, systems for generating synthetic driving scenes that include construction zones may use a number of additional techniques and features that do not apply when generating driving scenes without construction zones.

In some examples, a driving scene generator may be configured to receive input data including predetermined driving scene characteristics (or conditions) associated with a construction zone (and/or other type of temporary traffic control zone). For instance, a driving scene generator may receive input specifying that the synthetic driving scene to be generated should include a construction zone. Additionally or alternatively, the inputs to the driving scene generator may include predetermined object attributes and/or agent attributes that identify an object/agent as being associated with a construction zone. In other examples, the input data to the driving scene generator may specify the requested geometry of the construction zone (e.g., location, size, and/or shape) relative to the map data of the driving environment. The driving scene generator may provide the various predetermined conditions for the driving scene as tokens when executing the generative model, thereby causing the generative model to output a driving scene including a construction zone that is consistent with the predetermined conditions.

As noted above, objects and agents that are associated with a construction zone can convey different meanings and may behave differently from similar objects and agents that are not associated with a construction zone. For example, the way a pedestrian behaves in or around a construction zone is likely to be different from the way a construction worker behaves. Similarly, construction vehicles are likely to behave differently (e.g., different trajectories, different driving maneuvers, different abidance and lane following, etc.) than non-construction vehicles driving in or around a construction zone. Additionally, objects and agents associated with a construction zone might not always be located within the boundaries of the construction zone (e.g., highway flaggers, dump trucks moving into or out of the construction zone, etc.), and non-construction zone agents can sometimes move through construction zones. Therefore, when generating a synthetic driving scene including a construction zone, it may be important for the driving scene generator to distinguish between pedestrians and construction workers, between trucks and construction vehicles, between traffic cones and road debris, etc.

For static objects and agents associated with a construction zone, the driving scene generator may specifically identify the objects/agents as being associated with the construction zone, both within the object/agent tokens used to condition the model and within the driving scene output by the model. In some examples, the driving scene generator may use a single construction zone flag (or attribute) identifying the object/agent as a construction zone object or agent. For instance, an object token defining a predetermined object, pedestrian, or vehicle to be included in a driving scene may include various attributes indicating the location, size, orientation, trajectory, etc. of the object, along with a separate construction zone flag. When the construction zone flag is set, the object token may represent a construction-related object (e.g., traffic cone, traffic drum, lane barrier, etc.), construction worker, or construction vehicle. When the construction flag is not set, the object token may represent a non-construction object (e.g., road debris) or non-construction agent (e.g., pedestrian, bicycle, or vehicle). In some examples, rather than a single flag representing a construction attribute, the driving scene generator may use additional attributes within object or agent tokens to indicate additional construction-related characteristics of the object/agent. For example, the additional attributes may identify the specific type or characteristics of a construction worker (e.g., flagger holding a slow sign, flagger holding a stop sign, worker using a jackhammer, etc.), or the type or characteristics of construction vehicle (e.g., construction vehicle height, whether the construction vehicle is carrying a load that extends beyond the vehicle size, whether the construction vehicle includes a crane or arm that extends above the driving lane, etc.). As described below, any combination of predetermined construction objects and the various characteristics of the construction objects to be included in the driving scene can be received by the driving scene generator and used as tokens to condition to diffusion model. Therefore, when the diffusion model executes to generate a synthetic driving scene, it may use the tokens to guide the iterative de-noising operations, resulting in a driving scene that is both realistic (based on the model training) and consistent with the predetermined construction objects and characteristics represented by the tokens.

Instead of or in addition to using object tokens and agent tokens to guide the diffusion model when generating a driving scene, the driving scene generator also may use various scene-level tokens. While an object token or agent token may specify attributes for a particular object/agent to be included in the driving scene, a scene-level token may specify any number of attributes relating to the driving scene as a whole. For example, a scene-level token (or scene token) for the construction zone may specify the location, size, and/or shape of the construction zone within the driving environment. Scene tokens also may be used to specify the characteristics or category of the construction zone, and/or may include a text-based description of the construction zone. Additional scene tokens may include represent the density of the construction zone (e.g., the number of construction workers and vehicles relative to the size of the construction zone area), and/or the density of the scene around the construction zone (e.g., the number of pedestrians and vehicles traversing through or around the construction zone within the scene). The driving scene generator may provide any combination of scene tokens, along with any combination of object tokens, agent tokens, etc., to the diffusion model to condition the generation of the synthetic driving scene.

As described above, the driving scene generator may receive input data representing predetermined construction zone objects, construction zone agents, and/or construction zone-related characteristics for a driving scene to be generated by the diffusion model. The driving scene generator may use tokens to guide the diffusion model to generate a synthetic driving scene including a construction zone that is compatible with the predetermined objects, agents, and scene characteristics.

A synthetic driving scene generated and output by the diffusion model may define various objects/agents within the driving scene, any of which may include similar or identical construction zone attributes to those discussed above with respect to the predetermined input data and tokens used to condition the diffusion model. For instance, the output of the diffusion model may include image data representing a top-down view of a synthetic driving scene, including bounding shapes and associated attributes representing objects/agents. In such examples, a bounding shape in the top-down driving scene representation may include a flag indicating the object/agent is associated with a construction zone, and/or additional attributes further defining the type and characteristics of the construction zone object, worker, or vehicle, etc.

Generating synthetic driving scenes with objects/agents having construction zone-related attributes may provide advantages for the simulation system and/or other downstream components that use the synthetic driving scenes. For example, the simulation system may control agents that are associated with a construction zone (e.g., agents having a construction zone flag or attribute) differently from non-construction zone agents. The simulation system may use specialized heuristics and/or ML models to control the behaviors of simulated construction workers and vehicles, moving these construction workers/vehicles in and around the construction zone differently from the behavior patterns of non-construction pedestrians and vehicles in the simulation. Additionally, the simulation system may control various simulated objects and agents (including objects/agents both associated and not associated with the construction zone) to interact differently with construction zone objects (e.g., traffic cones, lane dividers, etc.) than with non-construction zone objects (e.g., road debris) during the simulation.

In addition to outputting synthetic driving scenes with objects having metadata relating to construction zones, the driving scene generator also may output data indicating the boundaries of the construction zone within the driving scene. For example, the driving scene generator may output a synthetic driving scene including an associated heat map representing the boundaries of the construction zone within the driving scene. The heat map can be generated by the diffusion model during the same diffusion process used to generate the driving scene, or may be generated by a separate model trained to receive top-down driving scene representations as input, and to output a heat map (or other representation of the construction zone boundaries) based on input driving scene. The construction zone heat map may be stored and output as a separate channel within the top-down driving scene representation, in which for each location (e.g., pixel) in the synthetic driving scene, the heat map may store binary value or probability indicating the likelihood that the location is within a construction zone.

As described below in more detail, using a driving scene generator to generate a construction zone heat map associated with a synthetic driving scene may provide additional technical advantages for executing driving simulations. For example, a simulation system may use the construction zone heat map to control agents (e.g., to avoid the construction zone or proceed more carefully near the construction zone). The simulation system also may evaluate the behavior of the simulated vehicles based on the construction zone map, such as determining a cost associated with a simulated vehicle driving through (rather than around) a construction zone. In these examples, the simulation system may be unable to control the simulated agents and/or evaluate the simulated vehicles in these ways, without being provided a construction zone heat map (or other construction zone boundaries) from the driving scene generator.

The diffusion model may be configured to generate synthetic driving scenes from initial (e.g., random) noise samples. As described below in more detail, the diffusion model may be trained based on latent embeddings of a variable autoencoder, using a training process in which the latent embeddings are "diffused" by adding noise (e.g., masking out a subset of the agents in the driving scene), and then subsequently de-noising by the diffusion model (e.g., adding agents back into the driving scene). The objects and agents masked out and/or added back during the training process may include objects/agents associated with a construction zone, and/or objects/agents not associated with a construction zone. After the diffusion model has been trained, it can be used to generate synthetic driving scenes based on random noise samples, by iteratively de-noising each sample while using the map data and agent tokens as conditioning inputs during the de-noising operations. The execution of the diffusion model (e.g., diffusion inference) may generate a latent embedding representing a driving scene, based on a random noise sample, which may be decoded by the decoder of the variable autoencoder, into a new synthetic driving scene. Additional examples of techniques for generating representations of objects in driving environments can be found, for example, in U.S. patent application Ser. No. 18/087,570, filed Dec. 22, 2022, and titled "Generating Object Representations Using a Variable Encoder," and in U.S. patent application Ser. No. 18/087, 540, filed Dec. 22, 2022, and titled "Latent Variable Determination By A Diffusion Model," both of which are incorporated by reference herein, in their entirety, for all purposes. Although various examples herein describe using diffusion models to generate synthetic driving scenes, other types of models can be used in such examples. For instance, any generative model that supports text-based conditioning may be used to generate synthetic driving scenes with conditioning by agent tokens, in any or all of the examples described herein.

Because the diffusion model (along with the variable autoencoder) is trained to generate synthetic driving scenes from initial random noise samples, it can generate any number of realistic driving scenes that include construction zones, based on the same map data and/or the same object/agent tokens. For instance, after receiving the map data and determining the agent tokens for one or more predetermined construction-related agents to be included in the scene, the diffusion model can be executed on a first random noise sample to generate a synthetic driving scene including a first construction zone, then executed again on a second random noise sample to generate a synthetic driving scene including a second different construction zone, and so on. Within the diffusion inference operations, the latent embeddings for each synthetic driving scene may develop independently as its random noise sample is iteratively de-noised, so that each of the resulting driving scenes is unique and independent, while also representing a realistic real-world driving scene based on the training of the diffusion model with real-world ground truth driving scenes.

As noted above, the diffusion model may be trained based on latent embeddings generated by a variable autoencoder. The variable autoencoder may use an encoder-decoder architecture (e.g., within a Convolutional Neural Network (CNN), Generative Adversarial Network (GAN), a GNN, a Recurrent Neural Network (RNN), another transformer model, etc.). The variable autoencoder may be trained to downsample driving scenes (using the encoder) into latent embeddings, and then upsample the latent embeddings back into driving scenes. In some examples, the input to the variable autoencoder may include image data representing a top-down view of a driving scene (e.g., using color to represent agent heading), and the decoder may be configured to output bounding box detections (e.g., rather than image data). In other examples, the variable autoencoder may be configured to receive any other type of driving scene representation for the encoder input and/or to generate any other type of driving scene representation as the decoder output, including but not limited to top-down image/sensor data, vehicle perspective image/sensor data, top-down multi-channel representations, bounding box (or bounding contour) representations, etc.

When training the diffusion model to generate a synthetic driving scene, a model training component may receive a latent embedding representing a ground truth driving scene including a construction zone, that has been encoded by the variable autoencoder. The training process for a diffusion model generally may include "diffusing" the latent embedding by adding noise, and then using the diffusion model to de-noise the latent embedding. For example, a latent embedding used for training the diffusion model may represent a ground truth driving scene, representing a specific driving environment (e.g., map data) including a construction zone, in which the construction zone and/or the additional areas of the driving environment are populated with various independent agents (e.g., vehicles, bicycles, pedestrians, animals, etc.). The training component for the diffusion model may randomly mask out objects from the ground truth driving scene (e.g., using random dropout probability and/or dropout masks). The latent embedding of the masked driving scene then may be provided to the diffusion model to "de-noise" the driving scene by adding agents back into the driving scene. Using these techniques, the diffusion model may be trained to generate realistic driving scenes including construction zones, including determining realistic relative positions of agents, realistic agent characteristics, and realistic potential interactions between agents in and around construction zones. Additionally, the diffusion model (or a separate ML model) may be trained to output a heatmap representing the bounds of the construction zone within the synthetic driving scene. The training component for the construction zone heat map model may use ground truth heat maps representing the boundaries of the driving scenes, and may train the model to predict accurate heat maps based on the driving scenes.

After the diffusion model has generated a synthetic driving scene including a construction zone (e.g., as a de-noised latent embedding), the driving scene generator may decode the latent embedding (e.g., using the decoder of the variable autoencoder) into a driving scene that can be used by various downstream components. As noted above, synthetic driving scenes may be used to perform driving simulations, which may provide a number of technical advantages for testing and validating the vehicle control systems of autonomous vehicles. For instance, synthetic driving scenes generated using diffusion models may allow for more robust coverage of simulated driving scenes and simulation scenarios involving construction zones (and/or other temporary traffic control zones) that do not occur frequently in real-world driving situations. For low-frequency construction zone driving scenarios, relatively less training data (e.g., vehicle log data) may be available, and thus driving scene generation models that rely solely on ground truth driving scenes may fail to adequately test vehicle systems when encountering construction zone scenarios. In contrast, the use of construction zone-related tokens and techniques for conditioning the diffusion model as described herein, may allow the driving scene generator to efficiently generate realistic construction zone driving scenes, allowing users to specify particular subsets of predetermined construction zone configurations, but without requiring users to perform time-consuming manual scene generation.

Although various examples herein describe using the synthetic driving scenes generated by the diffusion model to perform driving simulations involving construction zones, in other examples, the techniques herein may include generating synthetic driving scenes for use by various other components, including on-vehicle components used to control an autonomous vehicle within a real-world driving environment. For example, a prediction component of an autonomous vehicle may perform driving scene predictions based on the output of the generative model and such predictions may be considered during vehicle planning operations for the autonomous vehicle, to improve vehicle safety by planning for the possibility that additional agents in or around a construction zone may potentially intersect with or otherwise affect the autonomous vehicle. For instance, a prediction and/or planning component of an autonomous vehicle may use a generative model as described herein to predict the presence and/or behaviors of potential objects (e.g., construction objects and non-construction objects) within occluded portions of the driving environment in and around construction zones. Based on such predictions, the planning component may determine driving routes/trajectories for the autonomous vehicle when navigating near a construction zone, taking into account the possibility of the predicted occluded objects near the construction zone. The techniques described herein also may be used to generate synthetic driving scenes including construction zones, that can be used to train models to predict occluded objects within a driving environment (e.g., de-noising occluded regions of an environment based on the attributes of non-occluded objects).

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 depicts an example process 100 in which a driving scene generator 102 may use a generative model and input data to generate a synthetic driving scene including a construction zone. In some examples, the driving scene generator 102 may be integrated into or associated with a simulation system configured to perform driving simulations based on the synthetic driving scenes generated by the driving scene generator 102.

At operation 104, the driving scene generator 102 may receive map data representing a driving environment for a synthetic driving scene to be generated. In various examples, map data received in operation 104 may include image data, a top-down multi-channel representation, and/or any number of data structures (e.g., modeled in two dimensions, three dimensions, etc.) capable of providing information about a driving environment. The map data may include, but is not limited to, road network topologies including streets and intersections, drivable surface data, sidewalks, driveways, curbs, crosswalks, traffic signs and signals, lane data, road marking, road condition data, etc. In some cases, the map data may correspond to real-world map data captured by sensors of a vehicle, received from a map server, captured from a surveillance camera or satellite image, etc. In other cases, the map data may be synthetically generated and need not correspond to a real-world driving environment. For instance, the driving scene generator 102 may provide a map generation user interface that allows users to input (e.g., draw and/or configure) various configurations of driving environments. In this example, the received map data 106 depicts a four-lane curved roadway with a crosswalk.

At operation 108, the driving scene generator 102 may receive a set of characteristics associated with a temporary traffic control zone (e.g., a construction zone) to be included in the synthetic driving scene. In some examples, the data received in operation 108 may include an indication that the synthetic driving scene is to include a construction zone (e.g., without any additional predetermined agent data, scene data, etc.). Additionally or alternatively, the data received in operation 108 may include a set of attributes for one or more objects and/or agents associated with a construction zone (e.g., a traffic cone or lane barrier, a construction worker, a construction vehicle, etc.). The attributes of objects or agents may include any combination of the various object attributes described herein, such as the location, size, shape, object type, orientation, trajectory, etc., of the object. As an example, the object/feature data received in operation 108 may include one or more attributes of a traffic drum 110, a construction vehicle 112, a construction worker 114, and/or data representing a geometry 116 (e.g., a location, size, shape, layout, etc.) for a construction zone. Although this example depicts attributes of three different construction-related objects and a layout of a construction zone, in other examples, any amount of predetermined object/feature data may be received for the driving scene to be generated. In some cases, the data received in operation 108 may include only a single attribute (e.g., location) for a single construction object (e.g., a construction vehicle), and the generative model may use stable diffusion to generate a realistic driving scene, based on the map data, including a construction zone with the construction vehicle at the predetermined location, and any number of additional objects/agents within the driving scene.

In some examples, the objects/features of the driving scene received in operation 108 (e.g., agent characteristics, scene characteristics, construction zone characteristics, etc.), may be received by the driving scene generator 102 from a user (e.g., a simulation generation/execution administrator) via a user interface, API, client application, etc. For instance, the user (or other client system) may provide information indicating the number of predetermined agents (e.g., construction and/or non-construction agents), along with the agent types, sizes, positions, and trajectories within the driving environment. Additionally or alternatively, scene characteristics received in operation 108 may include the location, size, and/or shape of the construction zone within the driving environment, the characteristics or a category type of the construction zone, the density of the construction zone and/or the environment around the construction zone, etc.

When agent data is received in operation 108, the agent data may be represented as an agent token corresponding to an agent that is to be generated by the generative model in the synthetic driving scene. An agent token can include all of the attributes of the corresponding agent in the synthetic driving scene, or may include any specified subset of agent attributes. For agents (and/or other objects) associated with the construction zone, the agent attributes may include a flag identifying the agent as being associated with the construction zone, and/or may include any number of additional attributes applicable to the construction-related agent or object that might not be applicable to other agents/objects that are extraneous to the construction zone. As described above, when an agent token includes only a subset of agent attributes (e.g., position data and an object type, but not a heading or trajectory data or an object size, etc.), then the generative model may generate a corresponding agent having the specified agent attributes along with additional unspecified attributes that are determined realistically based on the diffusion/de-noising techniques described herein.

In some examples, the predetermined set of objects/features received in operation 108 (e.g., agent characteristics, scene features, etc.) may correspond to a particular type of driving scene with a construction zone that represents an interesting or important scenario for testing in one or more driving simulations. For instance, the positions and relative configurations of objects such as one or more traffic drums 110, construction vehicles 112, and/or construction workers 114, and/or a particular geometry 116 of the construction zone may be defined based on input from the user.

As described herein, any of the input data received in operation 108 can be received at various different levels of granularity, and may include any combination of broadly or narrowly defined objects or agents. As an example, the input data received in operation 108 may specify that a construction worker 114 is to be included within the synthetic driving scene, but might not define the position, size, or any other attributes of the construction worker 114. In another example, the input data may specify that a construction worker 114 is to be included in the synthetic driving scene, and also may specify a position (e.g., a precise position or general region) along with various additional attributes of the construction worker 114 (e.g., size, orientation, velocity, trajectory, construction sign status or job, associated construction objects, etc.). The input data received in operation 108 also may specify that a construction zone is to be included in the driving scene, but may or may not specify any geometry data for the construction zone to be included. The input data received in operation 108 can similarly include data specifying any other types of construction objects/agents to be included in the driving scene, as well as combinations of multiple objects/agents to include, where the input data for each object or agent may include any combination of object/agent attributes (e.g., positions, orientations, velocities, trajectories, behaviors, etc.) or no attributes. As described herein, the generative model may use diffusion and/or other generative techniques to determine the unspecified attributes for any objects/agents provided as input data, and also to determine attributes for any additional objects/agents that are generated to populate the synthetic driving scene.

In some examples, when a synthetic driving scene is generated for use in driving simulations, the attributes of the vehicle that is to be tested and validated in the simulation also may be received in operation 108. In such examples, the simulated vehicle may be labeled with a separate flag to distinguish it from the other predetermined agents/objects in the synthetic driving scene. In some cases, a designer of the synthetic driving scene may indicate that a particular simulated vehicle is the vehicle to be validated in the simulation, causing the driving scene generator 102 to apply the flag to the corresponding vehicle before outputting the synthetic driving scene to a simulation system. In other cases, the diffusion model may be configured to select one of the agents as the vehicle to be validated in the simulation (e.g., based on random selection, based on the scene configuration and/or layout of the objects in the driving scene, etc.).

After receiving object, agent, and/or scene characteristics for the predetermined agents and other features to be included in the driving scene, the driving scene generator 102 may generate agent tokens and/or scene to represent the predetermined agents and other scene features or characteristics. In some cases, object tokens, agent tokens and/or scene tokens may be generated as feature vectors encoding the object/agent/scene characteristics into a domain-specific language used to determine the various characteristics (e.g., size, location, heading, type, velocity, steering angle, trajectory, etc.).

At operation 118, the driving scene generator 102 may generate a synthetic driving scene based on the map data 106 and the various object and/or feature data received in operation 108. As shown in box 120, a generative model 122 (e.g., a diffusion model) may be trained to receive a random noise sample 124 and to perform iterative de-noising operations on the sample to generate a synthetic driving scene 132. The driving scene generator 102 also may provide the generative model 122 with map data 126 (e.g., corresponding to the received map data 106) and one or more tokens 130 (e.g., object tokens, agent tokens, and/or scene tokens based on the input data received in operation 108), which the generative model 122 may use as conditioning data during the de-noising operations. In some examples, the driving scene generator 102 may use an attention mechanism to provide the map data 126 and tokens 130 to the generative model 122. For instance, an attention mechanism may include self-attention layers for determining "attention" relationships between various agent tokens and/or object tokens (e.g., cross-attention data between a construction worker 114 and a construction vehicle 112 to be included in the driving scene).

Additionally or alternatively, the driving scene generator 102 may provide additional conditioning data to the generative model 122. For example, the driving scene generator 102 may receive, from a user or other client system via an interface, a construction zone mask 128 (e.g., a heat map) based on the geometry 116 and/or other construction zone boundary data received in operation 108. A construction zone mask 128 may identify the boundaries of a construction zone to be included in the driving scene, relative to the map data 106. In some cases, the driving scene generator 102 also may determine and provide various other conditioning data to the generative model 122, such as indicators of a desired scene density (and/or number of additional agents to generate) for the synthetic driving scene. A desired scene density may be provided for the driving scene as a whole, and/or for the construction zone to be generated within the driving scene. For instance, a construction zone scene density may indicate a number of total construction-related agents and/or a number of additional agents to be generated within the driving scene. Based on the scene density input, the driving scene generator 102 may generate one or more scene density tokens, which also may be provided to the generative model 122 and used as conditioning data during the de-noising operations. Additional examples of conditioning data are described below in reference to FIG. 3.

In this example, box 120 indicates that the generative model 122 may directly output the synthetic driving scene 132, by de-noising the random noise sample 124 into a realistic driving scene, using map data 126, a construction zone mask 128, and/or tokens 130 as conditioning data during the de-noising. However, as described below in more detail, a more complex architecture may be used in some cases, in which the generative model 122 generates and outputs latent variable data associated with the driving scene, rather than the synthetic driving scene itself. In such cases, the latent variable data output by the generative model 122 may be decoded by a trained variable autoencoder, which also receives the map data 126, to generate the synthetic driving scene 132.

At operation 134, the driving scene generator 102, or a simulation system associated with the driving scene generator 102, may perform one or more driving simulations based on the synthetic driving scene generated in operation 118. For instance, the driving scene generator 102 may provide a representation of the synthetic driving scene to a driving simulation system, such as the driving simulation system 602 described below. In this example, box 136 depicts a synthetic driving scene that may be generated by the generative model 122. As shown in this example, the synthetic driving scene includes a construction zone along the northbound side of the roadway at the curve. The synthetic construction zone in this example includes a construction vehicle and construction workers, and is bordered by traffic cones or other construction objects. The synthetic driving scene may be represented, for example, as image data (e.g., a top-down multi-channel representation of the driving environment), and may include bounding boxes (and/or other shapes, encoded data, etc.) to represent the various objects and/or agents in the driving scene.

As described herein, in some examples, the representation of the synthetic driving scene generated by the driving scene generator 102 and provided to the driving simulation system may represent a snapshot of a driving scene at a particular point in time. Based on the snapshot of the driving scene, the driving simulation system may control the movements and behaviors of the various objects and agents in the driving scene programmatically (e.g., using heuristics or trained models to control agent behaviors) in a realistic manner. In other examples, the representation of the synthetic driving scene generated by the driving scene generator 102 may include temporal aspects and/or instructions that can be used by the driving simulation system to control the objects/agents for any amount of time during the driving simulation. For instance, the synthetic driving scenes output by the driving scene generator 102 may include, for any or all agents within the driving scene, attributes such as velocities, trajectories, intended destinations within the driving environment, planned maneuvers for the agent to perform, driving styles and/or other data that may define or guide the behaviors of the agent during the simulation.

As noted above, the generative model 122 (and/or the variable autoencoder) may be trained using real-world driving scene data to generate realistic synthetic driving scenes. For example, the generative model 122 may be trained to generate and position additional objects and agents in a realistic manner, based on the conditioning map data 126, construction zone mask 128, and tokens 130, etc. The de-noising operations of the generative model 122 may generate object and agent (e.g., as latent variables) including realistic object/agent characteristics, realistic positioning of objects/agents relative to other objects/agents in the driving environment, and realistic potential relationships and interactions between the agents/objects of the driving environment. As described herein, the training techniques for the generative model 122 may allow the model to learn the meaning of the positioning of particular objects and/or agents, such as how the positioning of certain construction objects and agents relates to other objects (construction and non-construction objects and agents) in the driving environment. Thus, the generative model 122 may be trained to populate the driving scene as a whole, including the construction zone and areas around the construction zone, based on the map data 126 and tokens 130, to include additional objects/agents that realistically model the structure of complex driving scenes with construction zones, and including realistic relationships and interactions between the various agents.

Figure 2:
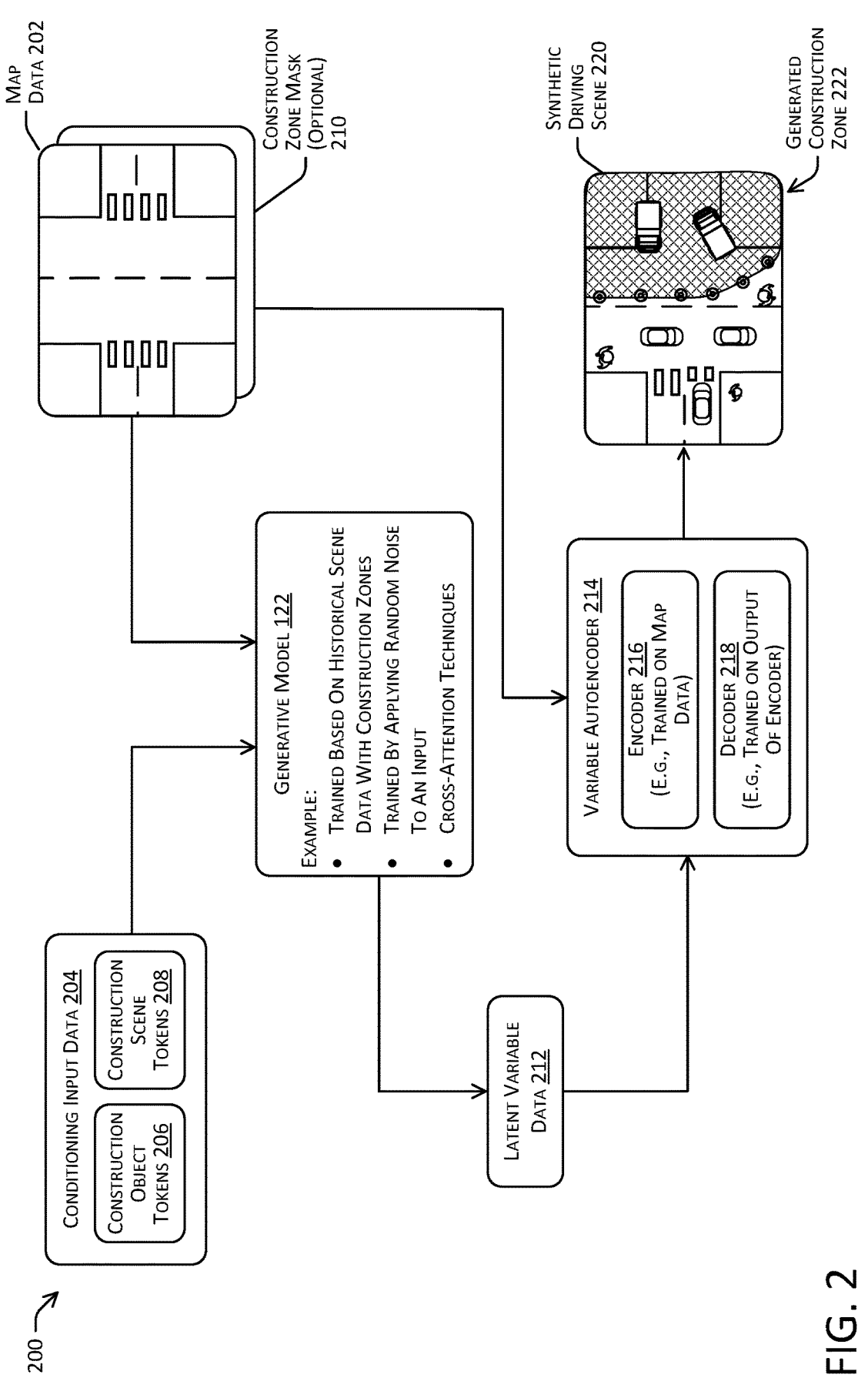
FIG. 2 is an example block diagram including a generative model and a variable autoencoder configured to generate synthetic driving scenes, in accordance with one or more examples of the disclosure.

FIG. 2 is a block diagram illustrating an example architecture 200 a computing system that may be used to generate synthetic driving scenes using a generative model as described herein. The example architecture 200 may include one or more computing devices (e.g., driving scene generator 102) configured to implement a generative model 122 and a variable autoencoder 214. In some examples, the techniques described in relation to FIG. 2 can be performed by a simulation system to generate and perform driving simulations on driving scenes/scenarios including construction zones. Additionally or alternatively, the techniques described in relation to FIG. 2 can be performed by an autonomous vehicle while operating in a driving environment (e.g., a real-world environment or a simulated environment), such as to perform prediction and/or trajectory planning within driving environments near construction zones.

As described above, the generative model 122 may include a trained diffusion model configured to receive map data 202 representing a driving environment (e.g., a real-world or simulated driving environment), and conditioning input data 204 that may guide or control the inference operations of the generative model 122 as it de-noises a random noise sample to generate a synthetic driving scene.

Using the map data 202 and conditioning input data 204, the generative model 122 may generate latent variable data 212 representing a synthetic driving scene. The variable autoencoder 214 may decode the latent variable data 212, and use the decoded latent variable data and the map data 202 to generate a synthetic driving scene 220 including a synthetic generated construction zone 222.

As noted above, the latent variable data 212 (e.g., a latent embedding) output by the generative model 122 may represent the various objects and/or agents generated by the model for the synthetic driving scene. For example, a latent embedding output by the generative model 122 may include feature vectors representing a set of bounding boxes and corresponding attributes (e.g., object types, sizes, orientations, trajectories, etc.) for the set of objects and agents generated by the model for the synthetic driving scene. In other examples, the generative model 122 may be configured to output various additional data/attributes for the objects/agents, including (but not limited to) speed and/or velocity, agent yaw and/or yaw rate, agent type and/or subtype, and/or other agent characteristics such as driving style (e.g., a driving aggression value, driving safety value, law-abidance value, driver awareness value, etc.).

As shown in this example, the conditioning input data 204 can include construction object tokens 206 and/or construction scene tokens 208. Construction object tokens 206, as discussed above, can include data representing a predetermined construction object (e.g., requested by a user or client system) that is to be included in the synthetic driving scene 220. A construction object token 206 may represent a predetermined static object (e.g., traffic cone, lane barrier, etc.) and/or an agent related to a construction zone (e.g., a construction worker, construction vehicle, etc.). A construction object token 206 can include, for its respective predetermined object, one or more attributes or characteristics of the object, including (but not limited to) the position of the object in the driving environment, the size and/or shape of the object (e.g., length, width, height, shape, etc.), the orientation of the object, and/or the type and subtype of the object, etc. For a predetermined construction-related agent, the construction object token 206 may include additional attributes, such as the agent's velocity, acceleration, trajectory, intended destination, planned path or planned maneuver for the agent (e.g., U-turn, lane change, driveway or parking space pull-out, etc.). In some examples, the construction object token 206 also may include previous and/or future state data associated with their respective objects, including any of the attributes or characteristics of the agent described herein at one or more previous timepoints or future timepoints relative to the current point in time of the synthetic driving scene 220.

The conditioning input data 204 also may include construction scene tokens 208 indicating various characteristics of a construction zone to be generated within the synthetic driving scene. Examples of the construction scene tokens 208 may include tokens specifying the size, shape, or location of a construction zone, a category/type of construction projection, and/or a number of construction objects/agents within or near the construction zone (e.g., indicating the number of objects/agents that the generative model 122 should generate within the construction zone of the synthetic driving scene 220). Although not shown in this example, the conditioning input data 204 also may object tokens for non-construction objects (e.g., objects and/or agents) outside of and/or extraneous to the construction zone, and/or scene tokens characterizing the driving scene as a whole (e.g., not specifically related to the construction zone within the driving scene). Additionally, in various examples, the conditioning input data 204 also may include one or more control policies for use during a driving simulation (e.g., policies to associate with the synthetic driving scene data). In some cases, the map data 202 and/or conditioning input data 204 may include features of the environment, such as (but not limited to) roadway boundaries, roadway centerlines, crosswalk permissions, traffic light permissions, etc. The example in FIG. 2 and other examples herein describe using tokens to condition the generative model 122 when generating a synthetic driving scene 220. However, the conditioning data 204 used by a generative model 122 need not be encoded or stored as tokens, and need not be provided as tokens to the generative model 122 as tokens. As used herein, a token can include conditioning data of any format that may be used by a generative model 122 to condition the generation of a synthetic driving scene. Examples of such conditioning data, which can be tokenized or not, may include binary signals indicating characteristics of the driving scene to generate (e.g., whether or not to include a construction zone), general text descriptions of the driving scene, and/or structured information identifying objects or agents to include in the driving scene.

The generative model 122 may generate the latent variable data 212 for the synthetic driving scene 220, based on the map data 202 and the conditioning input data 204. As shown in this example, the generative model 122 also may receive a construction zone mask 210, which may indicate the boundaries of the construction zone to be generated, relative to the map data 202. In some examples, the construction zone mask 210 may include a construction zone heat map incorporated as a separate channel within the top-down map data 202. When a construction zone mask 210 and/or input data indicating the construction zone location, layout, and/or geometry is received (e.g., via construction scene tokens 208), the generative model 122 may use this data to guide the diffusion process so that the synthetic driving scene 220 includes a construction zone at the specified location. In contrast, when the generative model 122 does not receive a construction zone mask 210 or other construction zone location/geometry data, then the diffusion process may be free to generate a realistic construction zone layout anywhere within the driving scene.

In various examples, the driving scene generator 102 may use one or more machine-learned models to output the conditioning input data 204 that is sent to the generative model 122. Such machine-learned models can, for example, include one or more self-attention layers for determining "attention" or a relationship between pairs or groups of object tokens (e.g., cross-attention data between a first construction agent token and a second non-construction agent token), as well as determining attention between the various object tokens and/or scene tokens. In such examples, the conditioning input data 204 can be generated using a transformer model or a GNN configured to generate cross-attention data between two or more agents in the driving environment, between agents and road features, agents and scene density tokens, etc.

In some examples, the driving scene generator 102 may provide the map data 202 and conditioning input data 204 to the generative model 122. The generative model 122 may be executed to de-noise a random noise sample into latent variable data 212, based at least in part on the map data 202 (optionally including the construction zone mask 210) and the conditioning input data 204. The latent variable data 212 may represent different state data (e.g., positions, sizes, headings, trajectories, and the like) for the predetermined objects/agents and any additional objects/agents generated during de-noising by the generative model 122. In some examples, the generative model 122 may employ cross-attention techniques to determine relationships between the various agents and/or other objects in the synthetic driving scene 220. The generative model 122 can, for example, output the latent variable data 212 based at least in part on applying one or more cross-attention algorithms to the conditional input data 204.

The generative model 122 may be implemented as a machine-learned model configured to perform a diffusion process to add and/or remove noise from an input. For instance, the generative model 122 can incrementally de-noise data to generate an output based on one or more conditioning inputs. In some examples, the generative model 122 can de-noise the map data 202 (and/or other input data, token, random noise data, and the like) to output latent variables (e.g., the latent variable data 212) associated with one or more agents. The generative model 122 can also output latent variable data 212 representing behaviors (e.g., states or intents) of one or more agents.

The variable autoencoder 214 may include an encoder 216 and a decoder 218 configured to provide a variety of functionality including generating occupancy data for one or more agents and/or objects within the synthetic driving scene 220. In various examples, the decoder may use the latent variable data 212 output by the generative model 122 to generate bounding boxes, bounding contours, and/or heat map data for the various synthetic generated agents and/or other objects within the generated construction zone 222 and other areas within the synthetic driving scene 220. As discussed herein, occupancy data (or occupancies) may refer to discrete arrangements of agents with respect to a physical or simulated environment based on discretized templates of regions with respect to map data and/or the position of a vehicle within the map data. For example, details of determining occupancies within regions, clustering or organizing/arranging the occupancy data into hierarchies to model scenarios, are discussed in U.S. application Ser. No. 16/866, 715, which is herein incorporated by reference in its entirety.

As shown in this example, the generative model 122 can generate the latent variable data 212 associated with different objects/agents, that when processed by the decoder 218 of the variable autoencoder 214, causes the synthetic generated objects/agents to be added into or otherwise included in the synthetic driving scene 220. Typically, a variable autoencoder includes training a decoder to output data similar to an output of the encoder. Using the generative model 122 to condition the decoder 218 as described herein may enable the decoder 218 to output data different from the output by the encoder 216 (e.g., determining object representations based on the map data 202 and latent variable data 212).

In various examples, the encoder 216 and/or the decoder 218 can be implemented using machine-learned models, such as CNNs, GNNs, GANs, RNNs, transformer models, and the like. As discussed herein, the encoder 216 can be trained based at least in part on map data and agent/object occupancy data (e.g., bounding boxes, heat maps, etc.). The occupancy data can indicate an area of the environment in which objects are likely to be located. The decoder 218 can be trained based at least in part on a loss between the output of the decoder 218 and an output of the encoder 216. In some examples, the decoder 218 can be trained to improve a loss that takes into consideration the latent variable data 212 from the generative model 122.

Figure 3:
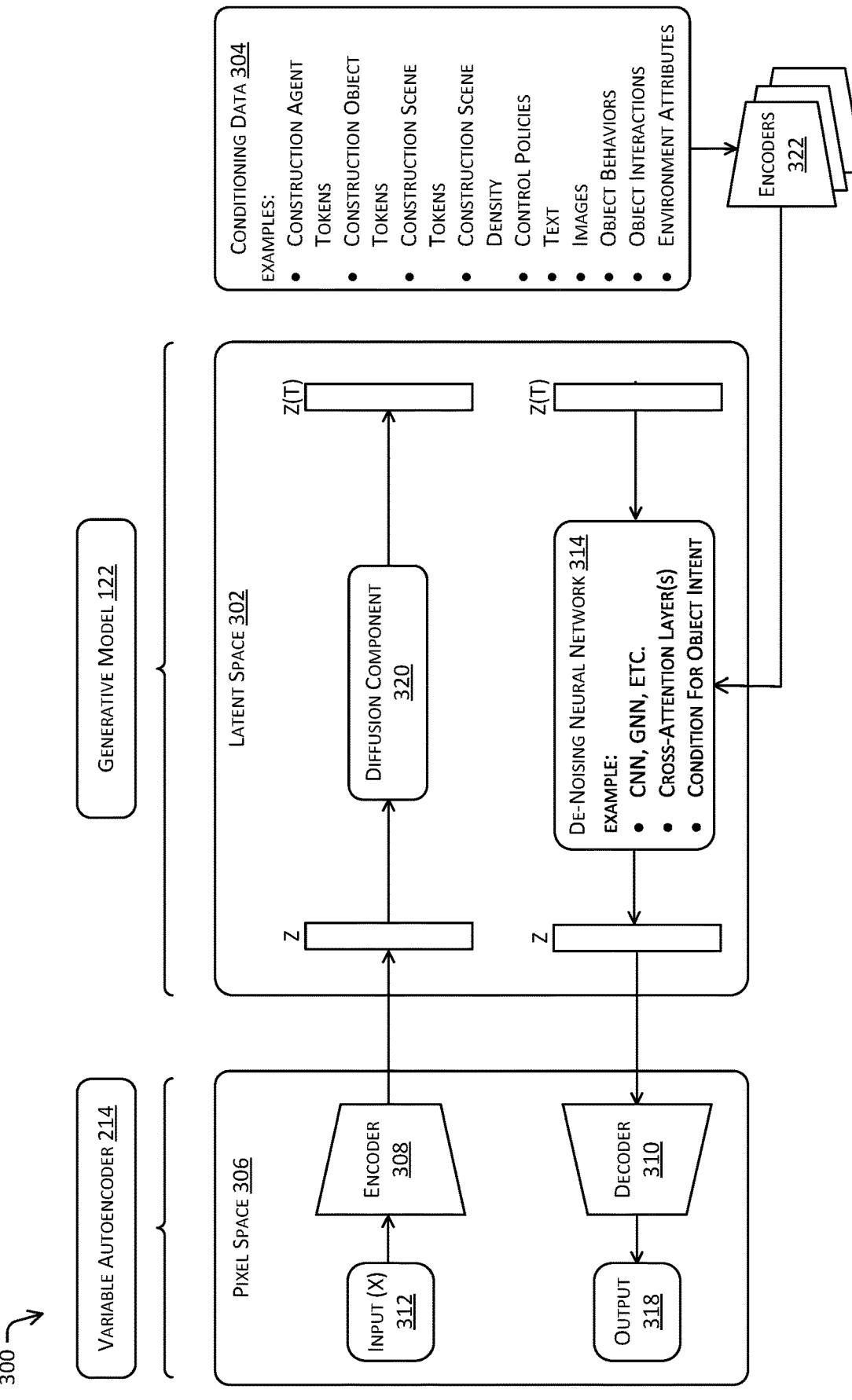
FIG. 3 is another example block diagram illustrating training and inference operations including a diffusion model and a variable autoencoder, in accordance with one or more examples of the disclosure.

FIG. 3 is a block diagram 300 illustrating an example generative model 122 implemented by a computing device to generate synthetic driving scenes, as described herein. In some examples, the techniques described in relation to FIG. 3 can be performed by a simulation system to generate and perform driving simulations. Additionally alternatively, the techniques described in relation to FIG. 3 can be performed by an autonomous vehicle while operating in a driving environment (e.g., a real-world environment or a simulated environment).

As described above in reference to FIG. 2, a driving scene generator 102 can implement a generative model 122 to generate latent variable data 212 for use by a machine-learned model, such as a variable autoencoder 214. As shown in this example, the generative model 122 may comprise latent space 302 for performing various steps (also referred to as operations) including adding noise to input data during training (shown as part of the diffusion process 320 in FIG. 3) and/or removing noise from input data during non-training (or inference) operations (shown as the de-noising neural network 314 in FIG. 3). The generative model 122 may receive conditioning data 304 for use during different diffusion steps to condition the input data, as discussed herein. For example, the conditioning data 304 can include one or more construction agent tokens, construction object tokens, construction scene tokens, construction scene density tokens, control policies, and/or various other object, agent, and scene tokens as described above. Additionally or alternatively, the conditioning data 304 may represent one or more semantic labels, text, images, object representations, object behaviors, vehicle representations, historical information associated with an agent and/or the vehicle, scene labels indicating a level of difficulty to associate with a simulation, environment attributes, or object interactions, to name a few.

In some examples, object/agent tokens within the conditioning data 304 can include semantic labels, node information, and the like. Such tokens can include, for example, text or an image describing an object or agent. In some examples, agent tokens can be a representation and/or a behavior associated with one or more agents in an environment. Agent tokens also may include data describing an agent, such as whether another vehicle is using a blinker or a pedestrian is looking towards the autonomous vehicle. In a non-limiting example, the agent tokens within the conditioning data 304 can include specifying an agent behavior, such as a level of aggression for a simulation that includes an autonomous vehicle. The conditioning data 304 may also or instead represent environmental attributes such as weather conditions, traffic laws, time of day, and the like.

FIG. 3 depicts the variable autoencoder 214 associated with a pixel space 306 that includes an encoder 308 and a decoder 310. In some examples, the encoder 308 and the decoder 310 can represent an RNN or a multilayer perceptron (MLP). In some examples, the encoder 308 can receive an input (x) 312 representing a driving scene (e.g., map data, object/agent state data, agent trajectories, and/or other input data), and may output embedded information Z in the latent space 302. In some examples, the embedded information Z can include a feature vector for each agent in the driving scene. The feature vector may include data representing the current state of the agent, such as the agent position, size, pose, trajectory, type, and/or other attributes, etc. In some examples, the input (x) 312 can represent a top-down representation of an environment including a number of agents and/or other objects (e.g., which can be determined by the construction object tokens 206 and/or other conditioning data 304). In some examples, the input (x) 312 can represent map data (e.g., map data 202) and/or occupancy data associated with a driving environment.

During training, the diffusion process 320 can perform an algorithm to apply noise to the embedded information Z to output a noisy latent embedding Z(T). When implementing the generative model 122 after training, the noisy latent embedding Z(T) (e.g., a representation of the input (x) 312) can be input into a de-noising neural network 314. The generative model 122 can initialize the noisy latent embedding Z(T) with random noise, and the de-noising neural network 314 (e.g., a CNN, a GNN, etc.) can apply one or more algorithms to determine an object/agent and intents based on applying different noise for different passes, or steps, to generate latent variable data that represents an object/agent intent in the future. In some examples, multiple objects/agent and intents can be considered during denoising operations.

By way of example and not limitation, input to the de-noising neural network 314 can include a graph of nodes in which at least some nodes represent respective agents and/or other objects. In such examples, the input data can be generated with random features for each object/agent, and the de-noising neural network 314 can include performing graph message passing operations for one or more diffusion steps. In this way, the de-noising neural network 314 can determine an agent intent (e.g., a position, size, heading, trajectory, etc.) for an agent with consideration to the intent of other agents and/or objects. By performing multiple diffusion steps, potential interactions between agents and/or other objects can change over time to best reflect how a diverse set of agents and/or other objects may behave in a real-world environment.

The conditioning data 304 can be used by the generative model 122 in a variety of ways including being concatenated with the noisy latent embedding Z(T) as input into the de-noising neural network 314. In some examples, the conditioning data 304 can be input during de-noising steps configured to apply a de-noising algorithm to an output of the de-noising neural network 314. Such de-noising steps may represent steps to apply the conditioning data 304 over time to generate the embedded information Z which can be output to the decoder 310 for use as initial states in a simulation that determines an output 318 representative of a synthetic driving scene including a number of objects and/or agents, including predicted object/agent state(s). As shown in this example, the construction object tokens, construction scene tokens, and/or other conditioning data 304 may be encoded using one or more encoders 322, and then provided to the de-noising neural network 314. Encoders 322 may be implemented, for example, using MLPs, transformers, etc., and configured to process the agent tokens and/or other conditioning data 304, before providing the collection of tokens to the de-noising neural network 314. In various examples, different encoders 322 may be used to process different types of tokens. For instance, a first transformer or MLP may be used to process agent tokens, while a second transformer or MLP may be used to process scene density tokens. When different types of agent tokens are implemented to support many-to-one relationships between agent tokens and agents, the encoders 322 may include different transformers/MLPs to process the different types of object/agent/scene tokens. For instance, a first transformer or MLP may be used to process agent tokens representing agent position and size, while a second transformer or MLP may be used to process agent tokens representing agent trajectories, etc.

A training component, described below in more detail, can train the generative model 122 based at least in part on a computed loss for the decoder 310 (e.g., the ability for the decoder to produce an output that is similar to the input to the encoder). That is, the generative model 122 can improve predictions over time based on being trained at least in part on a loss associated with the decoder 310. In some examples, the decoder 310 can be trained based at least in part on a loss associated with the generative model 122.

FIG. 4 represents a diagram 400 showing a technique of using a generative model 122 to generate a synthetic driving scene including a construction zone. As noted above, because the generative model 122 (along with the variable autoencoder 214 and additional related components described herein) may be trained to generate synthetic driving scenes from random noise samples, the generative model 122 can be used to generate any number of realistic driving scenes that include construction zones, based on the same map data and the same set of object/agent tokens and/or scene tokens defining the same set of predetermined input conditions for the driving scene that is to be generated.

As shown in this example, the generative model 122 may be provided with map data 402 and conditioning data including various tokens (e.g., construction zone tokens 404, and other tokens described herein). In this example, the construction zone tokens 404 may define one or more predetermined construction zone objects and/or agents, or other features of the construction zone to be generated. The construction zone tokens 404 (and/or non-construction zone tokens and/or other conditioning data) may be received via a user (or other client system) that has provided the driving scene generator 102 with characteristics for any predetermined objects, agents, scene features, etc. Based on the predetermined input data for the driving scene, the driving scene generator 102 has determined three construction zone tokens 404 in this example. In some cases, the generative model 122 also may receive a construction zone and/or scene density tokens indicating the numbers of construction zone agents and/or non-construction to be included in the synthetic driving scene.

The generative model 122 then may receive and de-noise a random noise samples 406 into a distinct and realistic synthetic driving scene. As described above, based on the map data 402, the conditioning input data 204 (e.g., construction zone tokens 404, etc.) (e.g., any or all of which may be provided to the generative model 122 as conditioning inputs via a cross-attention mechanism), the generative model 122 may generate a unique synthetic driving scene based on a random noise sample 406. Although this example shows the generative model 122 (along with the variable autoencoder 214) generating a single synthetic driving scene 408 with a construction zone, based on a single random noise sample, the generative model 122 may generate any number of distinct and realistic driving scenes based on different noise samples (e.g., random or not random).

In some examples, the synthetic driving scene 408 may include image data, such as a top-down perspective multi-channel view of the driving environment corresponding to the map data 402. Additionally or alternatively, the synthetic driving scene 408 may include various 2D and 3D representations of the driving environment. Within the top-down view in this example, the synthetic driving scene 408 may include bounding shapes representing the objects and/or agents within the synthetic driving scene, and different image channels may represent the instance metadata (e.g., the object type and various additional attributes for of each object/agent), such as the object type, type-specific object attributes, object heading, object velocity, object trajectory, object behavioral intent, etc. In this example, the synthetic driving scene 408 includes a number of objects and agents associated with the construction zone, including a first object 410 (e.g., a plastic drum marking the boundary of the construction zone) and a second object 412 (e.g., a construction worker holding a stop sign just in front of the construction zone). Although not shown in this example, the multi-channel top-down image data may include corresponding attributes for any or all of the additional objects and agents depicted in the synthetic driving scene 408, including the objects/agents inside of and/or associated with the construction zone, and the additional objects/agents outside of and/or not associated with the construction zone.

In this example, the synthetic driving scene 408 may represent a driving scene generated for use in a driving simulation, and the simulated vehicle 414 may represent the vehicle that is to be tested and/or validated during the driving simulation. Within the multi-channel image data of the synthetic driving scene 408, the simulated vehicle 414 may include some or all of the same attributes as other objects/agents in the driving scene (e.g., position, size, orientation, intent, etc.). Additionally, simulated vehicle 414 may include one or more flags indicating to the driving simulation system that the simulated vehicle 414 will be controlled during the simulation by the vehicle control systems being validated, rather than by the logic of the simulation system (e.g., heuristics and/or machine-learned models) that are used to control the other simulated objects/agents during the driving simulation.

In some examples, the output including the synthetic driving scene 408 also may include a construction zone heat map 416 corresponding to the driving scene. As shown in this example, the construction zone heat map 416 may identify the boundaries of the construction zone within the driving scene, using binary or probabilistic labels at each location (e.g., pixel) in the top-down image. In some cases, the construction zone heat map 416 may be output as a separate channel within the multi-channel top-down representation of the synthetic driving scene 408. In other cases, the construction zone heat map 416 may be output as a separate data structure, and may take the form of a heat map or any other location/geometry data defining boundaries for the construction zone.

When a construction zone heat map 416 (and/or other construction zone location/boundary data) is provided, a driving simulation system may use the heat map in various ways when performing driving simulations based on the synthetic driving scene. In some examples, the simulated vehicle 414 may be provided with the additional channels of the synthetic driving scene 408 (e.g., corresponding to the driving scene data that may be perceived by the simulated vehicle 414), but might not be provided to the channel(s) corresponding to the construction zone heat map 416. Instead, the driving simulation system may use the construction zone heat map 416 to evaluate the behavior of the simulated vehicle during the driving simulation. For example, the driving simulation system may impose costs on the behaviors of the simulated vehicle 414 for driving through the construction zone (e.g., overlapping any portion the construction zone heat map 416) rather than driving around the construction zone during the simulation. Similar costs may be imposed during the simulation if the simulated vehicle 414 drives too close to the construction zone, drives too fast while near/adjacent to the construction zone, etc. The simulation system may impose these costs to encourage the simulated vehicle 414 to drive safely near construction zones, in a way that could not be performed unless the simulation system was provided the construction zone heat map 416 (or other construction zone location/boundary data).

In other examples, the construction zone heat map 416 may be provided to the simulated vehicle 414 during a driving simulation based on the synthetic driving scene 408. For example, the simulated vehicle 414 may use the construction zone heat map 416 instead of relying on the particular vehicle control systems that are generally used to determine a construction zone boundaries on-vehicle. These cases may allow the driving simulation system to more thoroughly validate the other vehicle control systems used to control the simulated vehicle 414 in construction zone environments.

Figure 5:
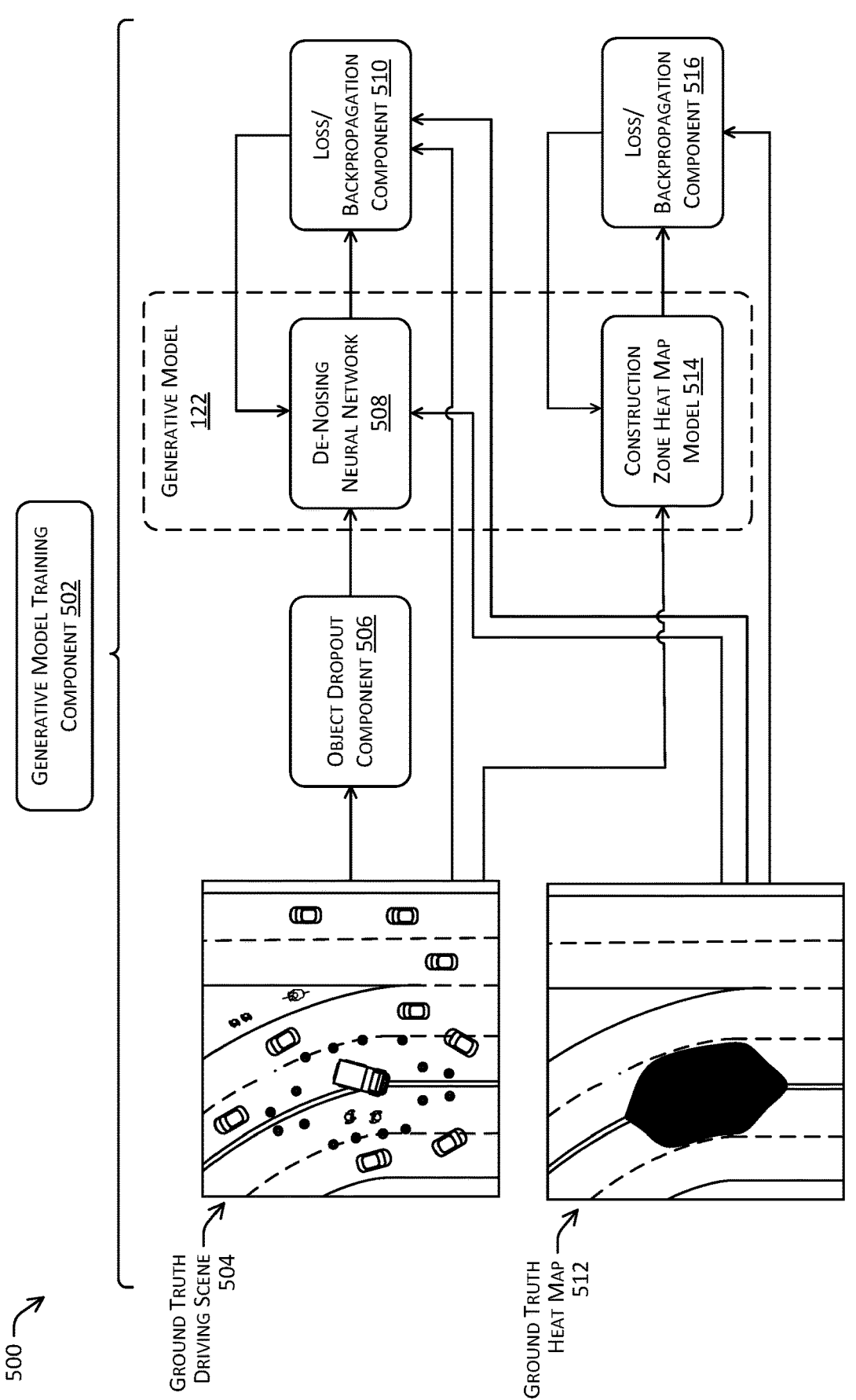
FIG. 5 illustrates example techniques for training a generative model to generate synthetic driving scenes and/or to generate temporary traffic control zone heat maps, in accordance with one or more examples of the disclosure.

FIG. 5 is a block diagram 500 illustrating examples techniques for training a diffusion model (e.g., generative model 22) to generate synthetic driving scenes, and training a separate model (e.g., a construction zone heat map model 514) to output construction zone heat maps corresponding to the same synthetic driving scenes.

In some examples, training the generative model 122 may include performing a diffusion process in which noise is added to a ground truth sample (e.g., a ground truth driving scene), after which the generative model 122 is executed (e.g., using a de-noising neural network 314 and associated cross-attention layers to provide conditioning data) to de-noise the ground truth sample. Loss data may be computed based on how effectively and accurately the diffusion model de-noises the ground truth sample (e.g., based on differences between the original and de-noised ground truth sample), and the diffusion model may be trained based on the loss data from any number of training processes.

After training the generative model 122, the generative model 122 may be used to generate realistic synthetic samples (e.g., synthetic driving scenes) based on random noise samples. For example, a randomly generated noise sample may be iteratively de-noised (e.g., using the de-noising neural network 314 and conditioning data), to generate a realistic synthetic driving scene that is conditioned based on the map data, one or more object/agent tokens, scene tokens, and/or other conditioning data.

In this example, FIG. 5 depicts an example training process for a generative model 122 trained to generate synthetic driving scenes. As shown in this example, a generative model training component 502 may be implemented to perform the training process. The generative model training component 502 may be incorporated into or associated with the driving scene generator 102 and/or a simulation system such as the driving simulation system 602 described herein.

Training the generative model 122 may include training a single ML model or multiple associated ML models corresponding to the generative model 122. For instance, the generative model 122 may include a de-noising neural network 508 (which may be similar or identical to the de-noising neural network 314 described above) configured to generate and populate realistic synthetic driving scenes. Additionally or alternatively, the generative model 122 may include a construction zone heat map model 514 trained to output construction zone heat maps (such as construction zone heat map 416) based on a ground truth driving scene 504. In this example, the de-noising neural network 508 and the construction zone heat map model 514 are depicted as separate ML models which may be trained and executed separately. However, in other examples, a generative model 122 implemented as a single ML model may be trained to output both a synthetic driving scene and a corresponding construction zone heat map (e.g., a single transformer model with separate output heads). In some instances, a generative model 122 may include a de-noising neural network 508 and not a construction zone heat map model 514, or vice versa.

To perform a training process (or training operation) on the generative model 122, the generative model training component 502 initially may receive a ground truth driving scene 504 including a construction zone. As noted above, the ground truth driving scene 504 may be based on real-world driving data (e.g., log data) captured by sensors of a vehicle driving in a real or simulated environment. The ground truth driving scene 504 may be provided to the generative model training component 502 in various data structures and/or formats, for example, as a top-down image and/or other sensor data, a top-down multi-channel representation including labeled bounding box representations of agents, etc.

The generative model training component 502 may include on object dropout component 506 configured to dropout (e.g., mask) a subset of the objects and/or agents within the ground truth driving scene 504. In some examples, the object dropout component 506 may determine (e.g., randomly) a dropout probability for the ground truth driving scene. The dropout probability may represent an amount (e.g., percentage) of the agents within the ground truth driving scene 504 to be dropped out (or masked out) during the diffusion process. The dropout probability may be determined by (but not limited to) sampling a random dropout probability between 0% and 100%. After determining a dropout probability, the object dropout component 506 may determine a dropout mask to apply to the ground truth driving scene 504. For example, the object dropout component 506 may use sampling techniques based on the dropout probability, to determine a dropout mask to apply to a driving scene. In some cases, the dropout probability can be applied individually to each object and/or agent in the ground truth driving scene 504, so that each object/agent has a N % probability of being masked out during the diffusion process. Additionally or alternatively, the object dropout component 506 may determine a random subset of the agents within the ground truth driving scene 504 to mask out, based on the dropout probability.

To train the generative model 122, the dropout mask determined by the object dropout component 506 may be applied to the ground truth driving scene 504, to determine a set of object tokens and/or agent tokens to use in a training iteration. Using the techniques described above, the various object/agent tokens may be provided to the de-noising neural network 508 (which may be similar or identical to the de-noising neural network 314 described above) to perform an iterative de-noising process. The de-noising neural network 508 may output a de-noised driving scene based on an input noise sample, where the conditioning data (including object/agent tokens) is used to condition the iterative de-noising process. The result of the conditioned de-noising process performed with the de-noising neural network 508 may represent a de-noised output driving scene, which may (but need not) be populated with one or more additional agents. In some cases, the de-noising neural network 508 also may receive the dropout probability used by the object dropout component 506 to diffuse the ground truth driving scene 504, thereby allowing the de-noising neural network 508 to learn to de-denoise the driving scene in a manner consistent with the ground truth scene density.

During each training iteration, the de-noised driving scene generated by the de-noising neural network 508 may be provided to a loss/backpropagation component 510. The loss/backpropagation component 510 may evaluate the de-noised driving scene by comparing it to the ground truth driving scene 504 used in that training iteration, and back-propagating (e.g., modifying) the de-noising neural network 508 based on the comparison.

Although the above examples describe using the object dropout component 506 to mask out particular objects and/or agents from the ground truth driving scene, in other examples the object dropout component 506 may use similar techniques to determine and mask out individual features of an object. For instance, a dropout probability sampling and/or dropout mask sampling process may be used to determine and mask out one or more individual agent features or attributes (e.g., location, size, heading, velocity, type, and/or trajectory, etc.) of the agents in the ground truth driving scene 504, while retaining other features/attributes of the agent for the subsequent agent token.

As described above, in some examples, the generative model 122 may be configured to receive input data that includes a heat map of a construction zone (e.g., geometry 116), and may output a synthetic driving scene including a construction zone corresponding to the heat map provided. In such examples, training the de-noising neural network 508 may include providing both the ground truth ground truth driving scene 504 (e.g., tokenized as described above) and the ground truth heat map 512 to the de-noising neural network 508 as ground truth training data. In other examples, the generative model 122 might not receive the ground truth heat map 512 as input data, but may be configured to output a predicted construction zone heat map. In these examples, the loss/backpropagation component 510 may receive and use the ground truth heat map 512 to evaluate the predicted construction zone heat map output by the de-noising neural network 508 during the training.

The training process described in this example may be performed any number of times, based on the ground truth driving scene 504 and/or a number of additional ground truth driving scenes. In some examples, multiple training processes may be executed based on the same ground truth driving scene, by sampling different (e.g., random) dropout probabilities, and/or different dropout masks based on the dropout probabilities, thereby robustly training the genera-tive model 122 to effectively perform de-noising for cases of different dropout probabilities and different configurations of masked agents.

FIG. 5 also depicts a training process for a construction zone heat map model 514. The construction zone heat map model 514 may be trained to output construction zone heat maps (such as construction zone heat map 416), based on a ground truth driving scene 504. In various examples, the construction zone heat map model 514 may be trained separately or in conjunction with the de-noising neural network 508. As shown in this example, to train the con-struction zone heat map model 514, the model may receive ground truth driving scene 504 (e.g., unmasked) and execute the model to output a construction zone heat map based on the ground truth driving scene 504. During each training iteration, the output of the construction zone heat map model 514 may be provided to a loss/backpropagation component 516. The loss/backpropagation component 516 may evaluate the output of the construction zone heat map model 514 by comparing it to a ground truth heat map 512, and back-propagating (e.g., modifying) the construction zone heat map model 514 based on the comparison.

Figure 6:
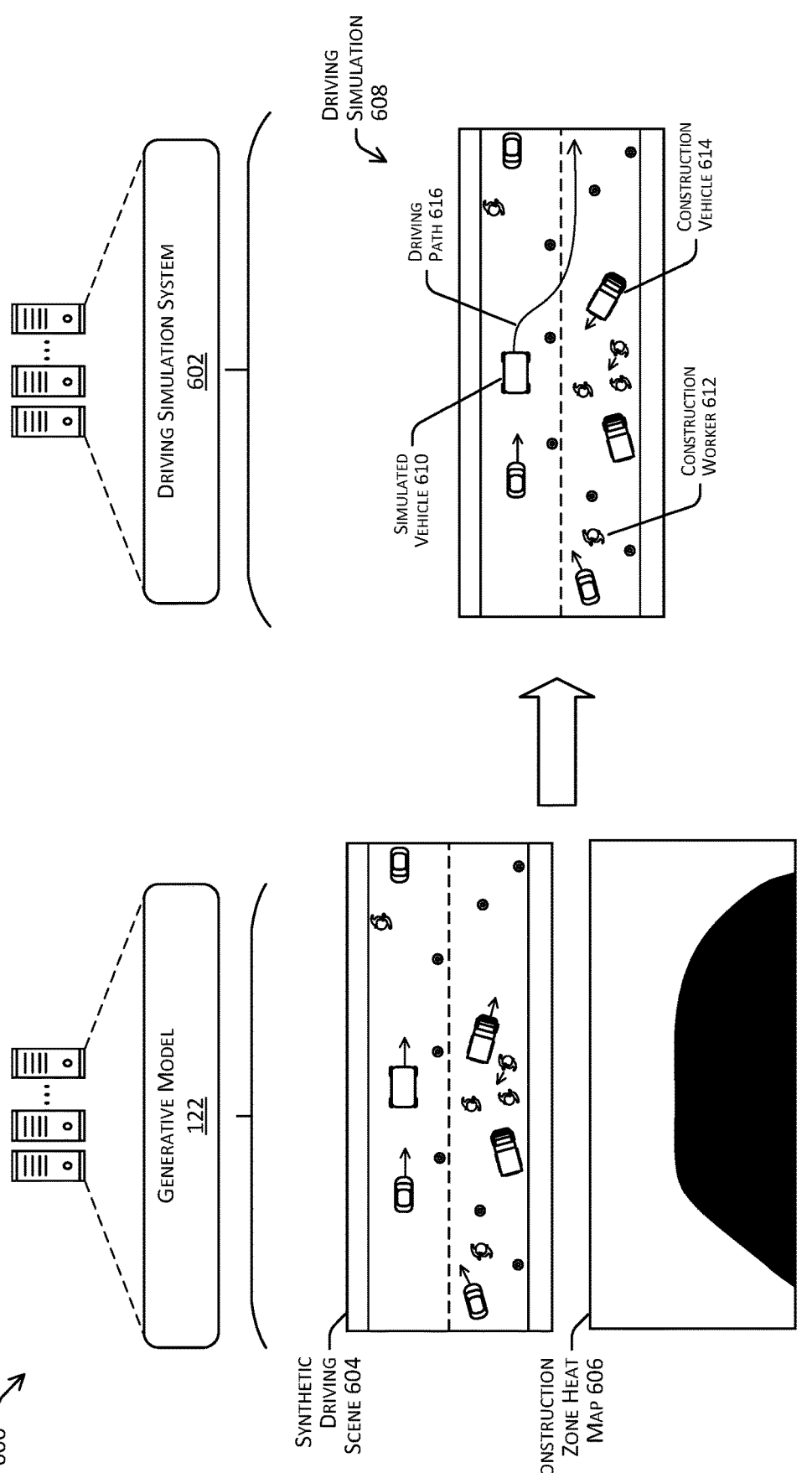
FIG. 6 illustrates an example technique using a driving scene generator to generate a synthetic driving scene including a temporary traffic control zone, and a driving simulation system to execute driving simulations based on the synthetic driving scene, in accordance with one or more examples of the disclosure

FIG. 6 depicts an example computing environment 600 including a generative model 122 for generating synthetic driving scenes including construction zones, and a driving simulation system 602 for performing driving simulations based on the generated driving scenes. As described herein, the generative model 122 may be configured to generate synthetic driving scenes and provide the driving scenes to the driving simulation system 602 configured to perform driving simulations based on the synthetic driving scenes. Although the generative model 122 and the driving simu-lation system 602 are depicted as separate and independent computing systems in this example, in other examples the generative model 122 and driving simulation system 602 may execute within the same system.

In this example, the generative model 122 may generate a synthetic driving scene 604 including a construction zone, and a construction zone heat map 606 corresponding to the synthetic driving scene 604. As described above, the con-struction zone heat map 606 may be output by the generative model 122 within the same multi-channel top-down repre-sentation as the synthetic driving scene 604 (e.g., as a separate channel with binary or probability values).

The driving simulation system 602, as described herein, may receive and use the synthetic driving scene 604 to perform one or more driving simulations 608. In this example, the synthetic driving scene 604 may identify a vehicle as the simulated vehicle 610 which is to be tested and validated during the driving simulations 608. Therefore, during the driving simulations, the simulated vehicle 610 may be controlled by the various vehicle control systems that are being validated (e.g., the vehicle control systems of an autonomous vehicle), whereas the additional objects/agents in the synthetic driving scene 604 may be controlled using various programmatic logic implemented by the driv-ing simulation system 602 (e.g., heuristics and/or machine-learned models for controlling programmatic agents).

As noted above, in some examples the objects/agents in the synthetic driving scene 604 may include attributes identifying the objects/agents as being associated with a construction zone. For instance, within the synthetic driving scene 604, the pedestrian 612 may be identified using metadata attributes as a construction worker, and the vehicle 614 may be identified as a construction vehicle. When executing the driving simulations 608, the driving simula-tion system 602 may use the metadata attributes relating to construction zones to control the various objects/agents. For instance, the driving simulation system 602 may control agents associated with a construction zone (e.g., pedestrian 612 and vehicle 614) differently from the other agents in the driving scene that are not associated with the construction zone (e.g., other pedestrians and vehicles moving in or around the driving scene). As an example, the driving simulation system 602 may control construction zone-re-lated agents to remain in or near the construction zone, and may control these agents to perform different types of movements and driving maneuvers (e.g., slow maneuvers, frequent backup maneuvers, no lane abidance or intended destination, etc.).

Additionally, in some cases, the driving simulation system 602 also may use the construction zone heat map 606 to control the driving simulations 608 and/or to evaluate the behavior of the simulated vehicle 610 during the driving simulations 608. For example, the driving simulation system 602 may control programmatic agents (e.g., non-construc-tion zone vehicles and other agents) to avoid construction zones during a driving simulation, and/or to move or maneu-ver differently when they are near a construction zone during a driving simulation (e.g., slower driving speeds, pedestrians crossing the street to maintain a minimum distance from the construction zone, etc.).

As described above, the driving simulation system 602 also may use the construction zone heat map 606 to evaluate the behaviors of the simulated vehicle 610 during driving simulations 608. For instance, the driving simulation system 602 may evaluate the driving behaviors and determine costs/loss values based on comparing the driving path 616 of the simulated vehicle 610 to the construction zone heat map 606. As shown in this example, when the driving path 614 of the simulated vehicle 610 drives through (rather than around) the construction zone during the simulation, the driving simulation system 602 may impose a cost to discourage cutting through construction zones. Similarly, the simulation system 602 may impose costs when the simulated vehicle 610 drives within a threshold distance of the construction zone boundary and/or drives greater than a threshold speed while it is near the construction zone, etc. Additionally, in some examples, the simulated vehicle 610 (e.g., the vehicle control systems controlling the behaviors of the simulated vehicle 610 during the simulation) may include a component to generate a construction zone heat map of a perceived driving environment including construction objects or agents. In such examples, the driving simulation system 602 may compare the construction zone heat map determined by the simulated vehicle 610 to the construction zone heat map 606 output by the generative model 122, to evaluate the performance of the construction zone heat map component of the simulated vehicle 610.

Figure 7:
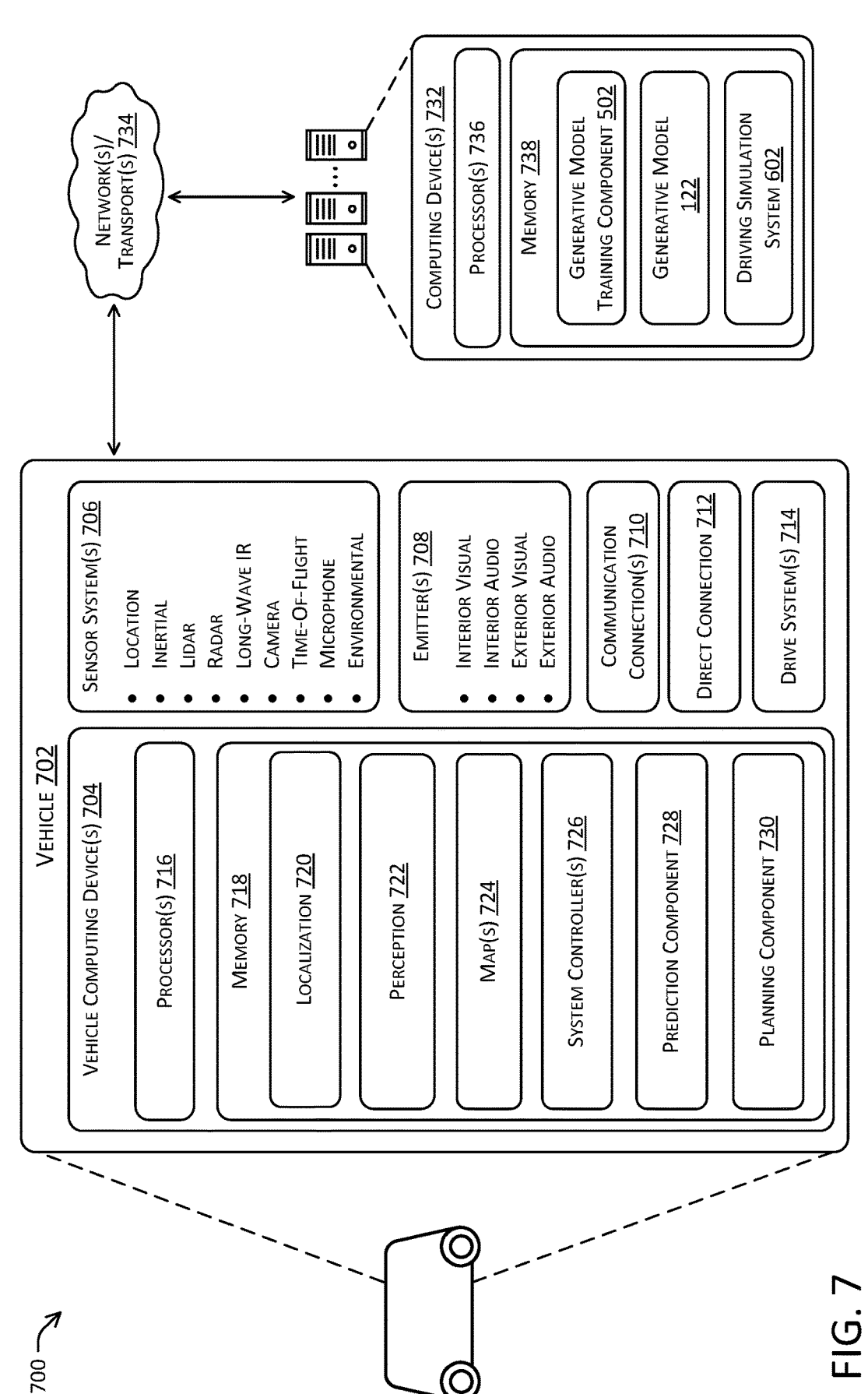
FIG. 7 depicts a block diagram of an example system for implementing various techniques described herein.

FIG. 7 illustrates an example computing environment 700 that may be used to implement the techniques described herein for generating synthetic driving scenes including construction zones, and generating and performing driving simulations based on the synthetic driving scenes. In this example, the computing environment 700 includes a vehicle 702 and computing device(s) 732 configured to generate synthetic driving scenes, and to execute and evaluate driving simulations based on the driving scenes. The vehicle 702 may include various software-based and/or hardware-based components of an autonomous vehicle, and may be used to control autonomous vehicles traversing through physical environments and/or simulated vehicles operating in driving simulations. The vehicle 702 may be similar or identical to any or all of the real and/or simulated vehicles or vehicle controllers described herein. The computing device(s) 732 may be similar or identical to the computing devices of the driving scene generator 102, generative model training component 502, and/or driving simulation system 602 described above in reference to FIGS. 1-6. In some examples, the vehicle 702 may correspond to a vehicle traversing a physical environment, capturing and storing log data which may be provided to the computing device(s) 732 and used to train generative models. Additionally or alternatively, the vehicle 702 may operate as one or more separate vehicle control systems, interacting with and being evaluated by the computing device(s) 732 during a driving simulation.

In at least one example, the vehicle 702 may correspond to an autonomous or semi-autonomous vehicle configured to perform object perception and prediction functionality, route planning and/or optimization. The example vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may not include a driver and/or controls for driving the vehicle 702, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 702 may include vehicle computing device(s) 704, sensor(s) 706, emitter(s) 708, communication connection(s) 710, at least one direct connection 712 (e.g., for physically coupling with the vehicle to exchange data and/or to provide power), and one or more drive system(s) 714. In this example, the vehicle 702 may correspond to vehicle 702 discussed above. The computing environment 700 may additionally or alternatively comprise vehicle computing device(s) 704.

In some instances, the sensor(s) 706 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 732.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 702 may also include communication connection(s) 710 (e.g., network interface(s)) that enable communication between the vehicle 702 and one or more other local or remote computing device(s). For instance, the communication connection(s) 710 may facilitate communication with other local computing device(s) on the vehicle 702 and/or the drive systems(s) 714. Also, the communication connection(s) 710 may additionally or alternatively allow the vehicle to communicate with other nearby computing device(s) (e.g., other nearby vehicles, traffic signals, etc.). The communication connection(s) 710 may additionally or alternatively enable the vehicle 702 to communicate with computing device(s) 732. In some examples, computing device(s) 732 may comprise one or more nodes of a distributed computing system (e.g., a cloud computing architecture).

The communication connection(s) 710 may include physical and/or logical interfaces for connecting the vehicle computing device(s) 704 to another computing device or a network, such as network(s) and/or transport(s) 734. For example, the communication connection(s) 710 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 704 and/or the sensor(s) 706 may send sensor data, via the network(s) and/or transport(s) 734, to the computing device(s) 732 at a particular frequency, after a lapse of a predetermined period of time, in near real-time, etc.

In some instances, the vehicle 702 may include one or more drive systems(s) 714 (or drive components). In some instances, the vehicle 702 may have a single drive system 714. In some instances, the drive system(s) 714 may include one or more sensors to detect conditions of the drive system(s) 714 and/or the surroundings of the vehicle 702. By way of example and not limitation, the sensor(s) of the drive systems(s) 714 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 714. In some cases, the sensor(s) on the drive systems(s) 714 may overlap or supplement corresponding systems of the vehicle 702 (e.g., sensor(s) 706).

The drive systems(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 714 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 714. Furthermore, the drive systems(s) 714 may also include one or more communication connection(s) that enable communication by the respective drive component with one or more other local or remote computing device(s).

The vehicle computing device(s) 704 may include processor(s) 716 and memory 718 communicatively coupled with the one or more processors 716. Computing device(s) 732 may also include processor(s) 736, and/or memory 738. As described above, the memory 738 of the computing device(s) 732 may store and execute a generative model training component 502, one or more generative models 122 (e.g., including one or more diffusion model(s) and variable autoencoder(s)), and/or a driving simulation system 602 configured to generate and perform driving simulations. Additional examples of techniques for using a driving simulation system 602 to generate and perform driving simulations can be found, for example, in U.S. patent application Ser. No. 16/708,019, filed Dec. 9, 2019, and titled "Perception Error Models," in U.S. patent application Ser. No. 16/798,073, filed Feb. 21, 2020, and titled "Synthetic Scenario Generator Using Distance-Biased Confidences For Sensor Data," and in U.S. patent application Ser. No. 17/459,214, filed Aug. 27, 2021, and titled "Synthetic Generation Of Simulation Scenarios And Probability-Based Simulation Evaluation," each of which are incorporated by reference herein, in their entirety, for all purposes.

The processor(s) 716 and/or 736 may be any suitable processor capable of executing instructions to process data and perform operations as described herein. By way of example and not limitation, the processor(s) 716 and/or 736 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 718 and/or 738 may be examples of non-transitory computer-readable media. The memory 718 and/or 738 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 718 and/or memory 738 may store a localization component 720, perception component 722, maps 724, system controller(s) 726, prediction component 728, and/or planning component 730.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include map(s) of an environment and can continuously determine a location, velocity, and/or orientation of the autonomous vehicle within the map(s). In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the planning component 730 and/or to the prediction component 728, a location and/or orientation of the vehicle 702 relative to the environment and/or sensor data associated therewith.

The memory 718 can further include one or more maps 724 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 724 may include at least one map (e.g., images and/or a mesh) generated in accordance with the techniques discussed herein. In some examples, the vehicle 702 can be controlled based at least in part on the maps 724. That is, the maps 724 can be used in connection with the localization component 720, the perception component 722, and/or the planning component 730 to determine a location of the vehicle 702, identify objects in an environment, and/or generate routes and/or trajectories to navigate within an environment.

In some instances, the perception component 722 may comprise a primary perception system and/or a prediction system implemented in hardware and/or software. The perception component 722 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 722 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 728 may include functionality to generate predicted information associated with objects in an environment. As an example, the prediction component 728 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 728 can generate one or more predicted positions, predicted velocities, predicted trajectories, etc., for such target objects based on attributes of the target object and/or other objects proximate the target object.

The planning component 730 may receive a location and/or orientation of the vehicle 702 from the localization component 720, perception data from the perception component 722, and/or predicted trajectories from the prediction component 728, and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 726 and/or drive systems(s) 714 may parse/cause to be carried out, second instructions for the emitter(s) 708 may be formatted according to a second format associated therewith). In at least one example, the planning component 730 may comprise a nominal trajectory generation subcomponent that generates a set of candidate trajectories, and selects a trajectory for implementation by the drive systems(s) 714 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 718 and/or 738 may additionally or alternatively store a mapping system (e.g., generating a map based at least in part on sensor data), a planning system, a ride management system, etc. Although localization component 720, perception component 722, the prediction component 728, the planning component 730, and/or system controller(s) 726 are illustrated as being stored in memory 718, any of these components may include processor-executable instructions, machine-learned model(s) (e.g., a neural network), and/or hardware and all or part of any of these components may be stored on memory 738 or configured as part of computing device(s) 732.

As described herein, the localization component 720, the perception component 722, the prediction component 728, the planning component 730, and/or other components of the computing environment 700 may comprise one or more ML models. For example, the localization component 720, the perception component 722, the prediction component 728, and/or the planning component 730 may each comprise different ML model pipelines. The prediction component 728 may use a different ML model or a combination of different ML models in different circumstances. For example, the prediction component 728 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 718 may additionally or alternatively store one or more system controller(s) 726, which may be configured to control steering, propulsion, braking, safety, emitters, communication, and other systems of the vehicle 702. These system controller(s) 726 may communicate with and/or control corresponding systems of the drive systems(s) 714 and/or other components of the vehicle 702.

It should be noted that while FIG. 7 is illustrated as a distributed system, in alternative examples, components of the vehicle 702 may be associated with the computing device(s) 732 and/or components of the computing device(s) 732 may be associated with the vehicle 702. That is, the vehicle 702 may perform one or more of the functions associated with the computing device(s) 732, and vice versa.

FIG. 8 is a flow diagram illustrating an example process 800 for generating synthetic driving scenes that include construction zones, and executing driving simulations based on the synthetic driving scenes. As described below, process 800 may be performed by one or more computer-based components configured to implement various functionalities described herein. For instance, process 800 may be performed by a driving scene generator 102 including (or associated with) a generative model 122 and variable autoencoder 214 trained to generate synthetic driving scenes by using diffusion techniques to de-noise random noise samples. Additionally or alternatively, some or all process 800 may be performed by a driving simulation system 602 configured to generate and perform driving simulations based on synthetic driving scenes, to test and validate the systems and features of autonomous vehicles.

Process 800 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 802, the driving scene generator 102 may receive data representing a driving environment (e.g., map data) for the synthetic driving scene to be generated. In various examples, map data received in operation 802 may include image data, top-down multi-channel representations, and/or any number of data structures capable of providing information about a driving environment. The map data may include, but is not limited to, road network topologies including streets and intersections, drivable surface data, sidewalks, driveways, curbs, crosswalks, traffic signs and signals, lane data, road marking, road condition data, etc. In some cases, the map data may correspond to real-world map data captured by sensors of a vehicle, received from a map server, captured from a surveillance camera or satellite image, etc. In other cases, the map data may be synthetically generated and need not correspond to a real-world driving environment.

At operation 804, the driving scene generator 102 may receive input data associated with various predetermined objects, agents, and/or scene features or characteristics to be included in the synthetic driving scene. As described herein, the predetermined input data may identify any number and/or configuration of objects, agents, and/or other driving scene characteristics, based on predetermined data received by a user and/or other client system. The predetermined input data received in operation 804 may be associated with a temporary traffic control zone (e.g., a construction zone) that is be included within the synthetic driving scene, such as desired configuration of construction-related objects and/or agents (and/or non-construction related objects/agents), which may include the vehicle to be validated during simulation and one or more additional objects/agents proximate to the vehicle in the driving environment.

At operation 806, the driving scene generator 102 may generate tokens based on the predetermined input data received in operation 804. In some examples, the driving scene generator 102 may determine tokens having one-to-one relationship with an object or agent to be included in the synthetic driving scene, and such tokens may represent objects/agents associated with the construction zone or external to and not associated with the construction zone. As a result, each token provided to the generative model may represent a single predetermined object or agent. Additional types of tokens may include, for example, scene density tokens, tokens corresponding to types or categories of construction zones to be generated, etc. In some examples, tokens may be generated as feature vectors, using a domain-specific language that may describe any number of characteristics of an object in a driving environment (e.g., object size, location, heading, type, velocity, trajectory, etc.). Tokens also may be generated using various different levels of granularity in different examples (e.g. pixel-level agent data versus broader object data).

At operation 808, the driving scene generator 102 may receive a random noise sample, and at operation 810, the driving scene generator 102 may generate the synthetic driving scene, by using the generative model 122 to de-noise the random noise sample. As described herein, the generative model 122 may generate and output latent variable data to a decoder of a trained variable autoencoder 214. The decoder may generate the synthetic driving scene using the map data and the latent variable data output by the generative model 122. The latent variable data may represent different state data (e.g., positions, sizes, headings, trajectories, and the like) for the predetermined agents and any additional agents generated during de-noising by the diffusion model. During the diffusion process, the generative model 122 may determine and populate the synthetic driving scene with any number of additional objects and/or agents, including additional objects/agents that may be inside or outside of the construction zone, and additional objects/agents that be associated with or extraneous to the construction zone. In some examples, the generative model 122 may generate the latent variable data associated with different objects and agents, that when processed by the decoder of the variable autoencoder 214, causes the synthetic generated agents to be added into or otherwise included in the synthetic driving scene. Additionally, as noted above, the generative model 122 may include a de-noising component (e.g., a trained de-noising neural network), and may include associated cross-attention layers used to provide conditioning data to the de-noising component.

At operation 812, the driving scene generator 102 may perform one or more driving simulations (and/or may initiate driving simulations to be performed on a separate driving simulation system 602), using the synthetic driving scene generated by the generative model 122 (and/or variable autoencoder 214) in operation 810. The driving simulations performed in operation 812 may include individual simulations or larger simulation batteries configured to validate the responses of an autonomous vehicle to various construction zone-related simulation scenarios based on the synthetic driving scene. In some examples, a driving simulation system 602 can execute a simulated scenario on the synthetic driving scene, including generating simulation data that indicates how an autonomous vehicle controller and/or other objects would respond given the simulated scenario, including the autonomous vehicle controller behaves when traversing in or around a construction zone.

At operation 814, the driving scene generator 102 may determine whether or not to generate additional synthetic driving scenes. For instance, when additional driving scenes are requested or required for obtaining additional simulation coverage of an autonomous vehicle controller (814: Yes), the driving scene generator 102 may receive (e.g., generate) an additional random noise sample at operation 816. Additionally or alternatively, when additional synthetic driving scenes are needed (814: Yes), the driving scene generator 102 may alter the tokens to request different configurations of predetermined objects/agents, different scene densities, etc., within the synthetic driving scene. In such cases, additionally or alternatively, the driving scene generator 102 also may modify and/or replace the map data associated with the driving scene, and/or the agent tokens representing the predetermined configuration of agents to be included in the synthetic driving scene.

EXAMPLE CLAUSES

A. A system comprising: one or more processors; and one or more non-transitory computer-readable media storing computer-executable instructions that, when executed, cause the one or more processors to perform operations comprising: receiving data representing a driving environment; determining a first token representing an attribute of a first object associated with a temporary traffic control zone; providing, to a generative model, the data representing the driving environment and the first token; generating, based at least in part on an output of the generative model, a synthetic driving scene including the temporary traffic control zone and the first object within the temporary traffic control zone, wherein the generative model is trained to generate the first object based at least in part on the first token; and performing a driving simulation based at least in part on the synthetic driving scene.

B. The system of paragraph A, the operations further comprising: receiving a location of the temporary traffic control zone within the driving environment; determining a second token representing the location of the temporary traffic control zone; and providing the second token to the generative model, wherein the generative model determines a position of the first object within the temporary traffic control zone based at least in part on the second token.

C. The system of paragraph A, wherein the first token represents a position and a size associated with the first object, and wherein the generative model determines a location and a geometric shape of the temporary traffic control zone based at least in part on the first token.

D. The system of paragraph A, wherein: the synthetic driving scene includes a top-down representation of the driving environment; the top-down representation includes a channel storing a location of the temporary traffic control zone within the driving environment; and performing the driving simulation comprises evaluating a behavior of a vehicle during the driving simulation, based at least in part on comparing a driving path of the vehicle to the location of the temporary traffic control zone.

E. The system of paragraph A, wherein: the first token represents an object type of the first object, the object type comprising at least one of a construction zone worker object type or a construction zone vehicle object type; and performing the driving simulation comprises controlling the first object during the driving simulation, based at least in part on the object type.

F. A method comprising: receiving, by a scene generator, map data representing a driving environment; receiving, by the scene generator, first input data associated with a temporary traffic control zone; and generating, using a generative model and based at least in part on the map data, scene data representing a driving scene, wherein the driving scene includes the temporary traffic control zone and a first object associated with the temporary traffic control zone, and wherein the generative model is trained to generate the first object based at least in part on the first input data.

G. The method of paragraph F, wherein the first input data represents a location of the temporary traffic control zone within the driving environment, and wherein the generative model determines a position of the first object based at least in part on the location of the temporary traffic control zone.

H. The method of paragraph F, wherein the first input data represents a first object attribute associated with the first object, and wherein the generative model determines a location of the temporary traffic control zone based at least in part on the first object attribute.

I. The method of paragraph F, wherein the first input data represents at least one of: a driving scene attribute associated with the driving scene; or a first object attribute associated with the first object, and wherein the method further comprises: determining a first token based at least in part on the first input data; and providing the first token to the generative model, wherein the generative model is configured to generate the scene data using a diffusion process conditioned based at least in part on the first token.

J. The method of paragraph F, wherein generating the first object comprises at least one of: determining a position for the first object within the temporary traffic control zone; or determining a first object attribute of the first object, wherein the first object attribute is associated with temporary traffic control zone.

K. The method of paragraph F, wherein the driving scene includes a top-down representation of the driving environment, and wherein the top-down representation includes a channel storing a location of the temporary traffic control zone within the driving environment.

L. The method of paragraph K, further comprising: performing a driving simulation, based at least in part on the driving scene, to simulate potential interactions between a vehicle and the first object in the driving environment; and evaluating a behavior of the vehicle during the driving simulation, based at least in part on comparing a driving path of the vehicle to the location of the temporary traffic control zone.

M. The method of paragraph F, wherein the scene data includes a first object attribute representing an object type of the first object, wherein the object type comprises at least one of: a traffic safety equipment object type; a traffic control zone worker object type; or a traffic control zone vehicle object type.

N. The method of paragraph M, further comprising: performing a driving simulation, based at least in part on the driving scene, to simulate potential interactions between a vehicle and the first object in the driving environment; and controlling the first object during the driving simulation, based at least in part on the object type.

O. One or more non transitory computer readable media storing instructions executable by a processor, wherein the instructions, when executed, cause the processor to perform operations comprising: receiving, by a scene generator, map data representing a driving environment; receiving, by the scene generator, first input data associated with a temporary traffic control zone; and generating, using a generative model and based at least in part on the map data, scene data representing a driving scene, wherein the driving scene includes the temporary traffic control zone and a first object associated with the temporary traffic control zone, and wherein the generative model is trained to generate the first object based at least in part on the first input data.

P. The one or more non transitory computer readable media of paragraph O, wherein the first input data represents a location of the temporary traffic control zone within the driving environment, and wherein the generative model determines a position of the first object based at least in part on the location of the temporary traffic control zone.

Q. The one or more non transitory computer readable media of paragraph O, wherein the first input data represents a first object attribute associated with the first object, and wherein the generative model determines a location of the temporary traffic control zone based at least in part on the first object attribute.

R. The one or more non transitory computer readable media of paragraph O, wherein the first input data represents at least one of: a driving scene attribute associated with the driving scene; or a first object attribute associated with the first object, and wherein the operations further comprise: determining a first token based at least in part on the first input data; and providing the first token to the generative model, wherein the generative model is configured to generate the scene data using a diffusion process conditioned based at least in part on the first token.

S. The one or more non transitory computer readable media of paragraph O, wherein generating the first object comprises at least one of: determining a position for the first object within the temporary traffic control zone; or determining a first object attribute of the first object, wherein the first object attribute is associated with temporary traffic control zone.

T. The one or more non transitory computer readable media of paragraph O, wherein the driving scene includes a top-down representation of the driving environment, wherein the top-down representation includes a channel storing a location of the temporary traffic control zone within the driving environment, and wherein the operations further comprise: performing a driving simulation, based at least in part on the driving scene, to simulate potential interactions between a vehicle and the first object in the driving environment; and evaluating a behavior of the vehicle during the driving simulation, based at least in part on comparing a driving path of the vehicle to the location of the temporary traffic control zone.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receiving data representing a driving environment;
determining a first token representing an attribute of a first object associated with a temporary traffic control zone;
providing, to a diffusion model trained to output a synthetic driving scene, the data representing the driving environment and the first token;
generating, based at least in part on an output of the diffusion model, the synthetic driving scene including the temporary traffic control zone and the first object within the temporary traffic control zone, wherein the diffusion model is trained to generate the first object based at least in part on the first token; and
performing a driving simulation based at least in part on the synthetic driving scene.

2. The system of claim 1, the operations further comprising:
receiving a location of the temporary traffic control zone within the driving environment;
determining a second token representing the location of the temporary traffic control zone; and
providing the second token to the diffusion model, wherein the diffusion model determines a position of the first object within the temporary traffic control zone based at least in part on the second token.

3. The system of claim 1, wherein the first token represents a position and a size associated with the first object, and wherein the diffusion model determines a location and a geometric shape of the temporary traffic control zone based at least in part on the first token.

4. The system of claim 1, wherein:
the synthetic driving scene includes a top-down representation of the driving environment;
the top-down representation includes a channel storing a location of the temporary traffic control zone within the driving environment; and
performing the driving simulation comprises evaluating a behavior of a vehicle during the driving simulation, based at least in part on comparing a driving path of the vehicle to the location of the temporary traffic control zone.

5. The system of claim 1, wherein:
the first token represents an object type of the first object, the object type comprising at least one of a construction zone worker object type or a construction zone vehicle object type; and
performing the driving simulation comprises controlling the first object during the driving simulation, based at least in part on the object type.

6. A method comprising:

receiving, by a scene generator, map data representing a driving environment;

receiving, by the scene generator, first input data associated with a temporary traffic control zone; and generating, using a diffusion model trained to output a driving scene based at least in part on the map data, scene data representing the driving scene, wherein the driving scene includes the temporary traffic control zone and a first object associated with the temporary traffic control zone, and wherein the diffusion model is trained to generate the first object based at least in part on the first input data.

7. The method of claim 6, wherein the first input data represents a location of the temporary traffic control zone within the driving environment, and wherein the diffusion model determines a position of the first object based at least in part on the location of the temporary traffic control zone.

8. The method of claim 6, wherein the first input data represents a first object attribute associated with the first object, and wherein the diffusion model determines a location of the temporary traffic control zone based at least in part on the first object attribute.

9. The method of claim 6, wherein the first input data represents at least one of:

a driving scene attribute associated with the driving scene; or a first object attribute associated with the first object, and wherein the method further comprises:

determining a first token based at least in part on the first input data; and providing the first token to the diffusion model, wherein the diffusion model is configured to generate the scene data using a diffusion process conditioned based at least in part on the first token.

10. The method of claim 6, wherein generating the first object comprises at least one of:

determining a position for the first object within the temporary traffic control zone; or determining a first object attribute of the first object, wherein the first object attribute is associated with temporary traffic control zone.

11. The method of claim 6, wherein the driving scene includes a top-down representation of the driving environment, and wherein the top-down representation includes a channel storing a location of the temporary traffic control zone within the driving environment.

12. The method of claim 11, further comprising:

performing a driving simulation, based at least in part on the driving scene, to simulate potential interactions between a vehicle and the first object in the driving environment; and evaluating a behavior of the vehicle during the driving simulation, based at least in part on comparing a driving path of the vehicle to the location of the temporary traffic control zone.

13. The method of claim 6, wherein the scene data includes a first object attribute representing an object type of the first object, wherein the object type comprises at least one of:

a traffic safety equipment object type;

a traffic control zone worker object type; or a traffic control zone vehicle object type.

14. The method of claim 13, further comprising:

performing a driving simulation, based at least in part on the driving scene, to simulate potential interactions between a vehicle and the first object in the driving environment; and controlling the first object during the driving simulation, based at least in part on the object type.

15. One or more non-transitory computer-readable media storing instructions executable by a processor, wherein the instructions, when executed, cause the processor to perform operations comprising:

receiving, by a scene generator, map data representing a driving environment;

receiving, by the scene generator, first input data associated with a temporary traffic control zone; and generating, using a diffusion model trained to output a driving scene based at least in part on the map data, scene data representing the driving scene, wherein the driving scene includes the temporary traffic control zone and a first object associated with the temporary traffic control zone, and wherein the diffusion model is trained to generate the first object based at least in part on the first input data.

16. The one or more non-transitory computer-readable media of claim 15, wherein the first input data represents a location of the temporary traffic control zone within the driving environment, and wherein the diffusion model determines a position of the first object based at least in part on the location of the temporary traffic control zone.

17. The one or more non-transitory computer-readable media of claim 15, wherein the first input data represents a first object attribute associated with the first object, and wherein the diffusion model determines a location of the temporary traffic control zone based at least in part on the first object attribute.

18. The one or more non-transitory computer-readable media of claim 15, wherein the first input data represents at least one of:

a driving scene attribute associated with the driving scene; or a first object attribute associated with the first object, and wherein the operations further comprise:

determining a first token based at least in part on the first input data; and providing the first token to the diffusion model, wherein the diffusion model is configured to generate the scene data using a diffusion process conditioned based at least in part on the first token.

19. The one or more non-transitory computer-readable media of claim 15, wherein generating the first object comprises at least one of:

determining a position for the first object within the temporary traffic control zone; or determining a first object attribute of the first object, wherein the first object attribute is associated with the temporary traffic control zone.

20. The one or more non-transitory computer-readable media of claim 15, wherein the driving scene includes a top-down representation of the driving environment, wherein the top-down representation includes a channel storing a location of the temporary traffic control zone within the driving environment, and wherein the operations further comprise:

performing a driving simulation, based at least in part on the driving scene, to simulate potential interactions between a vehicle and the first object in the driving environment; and

43

44 evaluating a behavior of the vehicle during the driving simulation, based at least in part on comparing a driving path of the vehicle to the location of the temporary traffic control zone.

* * * * *